United States Patent
To et al.

(10) Patent No.: US 10,318,265 B1
(45) Date of Patent: Jun. 11, 2019

(54) TEMPLATE GENERATION FOR DEPLOYABLE UNITS

(71) Applicant: Amazon Technologies, Inc., Seattle, WA (US)

(72) Inventors: Quan Binh To, Redmond, WA (US); Julien Jacques Ellie, Issaquah, WA (US); Zachary Thomas Crowell, Redmond, WA (US); Benjamin David Newman, Seattle, WA (US); Christopher Whitaker, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 174 days.

(21) Appl. No.: 14/880,134

(22) Filed: Oct. 9, 2015

(51) Int. Cl.
| | |
|---|---|
| G06F 9/44 | (2018.01) |
| G06F 8/61 | (2018.01) |
| H04L 29/08 | (2006.01) |
| G06F 9/455 | (2018.01) |

(52) U.S. Cl.
CPC ............ G06F 8/61 (2013.01); G06F 9/45558 (2013.01); H04L 67/34 (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 7,770,151 | B2 * | 8/2010 | Sanjar | G06F 8/61 |
| | | | | 717/109 |
| 8,176,114 | B2 * | 5/2012 | Vandanapu | G06F 8/61 |
| | | | | 709/201 |
| 8,417,658 | B2 * | 4/2013 | Arnold | G06N 5/02 |
| | | | | 706/48 |
| 8,589,916 | B2 * | 11/2013 | Gao | G06F 8/61 |
| | | | | 717/174 |
| 8,762,989 | B2 * | 6/2014 | Rowe | G06F 8/60 |
| | | | | 717/177 |
| 8,843,918 | B2 * | 9/2014 | Semerdzhiev | G06F 9/455 |
| | | | | 717/174 |
| 8,843,919 | B1 * | 9/2014 | Weathersby | G06F 8/60 |
| | | | | 717/174 |

(Continued)

OTHER PUBLICATIONS

Tsai, Wei-Tek, Xin Sun, and Janaka Balasooriya. "Service-oriented cloud computing architecture." Information Technology: New Generations (ITNG), 2010 Seventh International Conference on. IEEE, 2010. (Year: 2010).*

(Continued)

*Primary Examiner* — Matthew J Brophy
(74) *Attorney, Agent, or Firm* — Robert C. Kowert; Meyertons, Hood, Kivlin, Kowert & Goetzel, P.C.

(57) ABSTRACT

Methods, systems, and computer-readable media for implementing template generation for deployable units are disclosed. An indication of a deployable unit is received by a catalog system. A deployment template is generated that represents one or more directives for deploying the deployable unit. The deployment template is generated based at least in part on analysis of the deployable unit by the catalog system. The deployable unit is deployed to one or more resources of a multi-tenant provider network. The deployable unit is deployed based at least on part on the directives of the deployment template.

20 Claims, 12 Drawing Sheets

(56) References Cited

U.S. PATENT DOCUMENTS

| | | | |
|---|---|---|---|
| 8,862,883 B2 | 10/2014 | Cherukuri et al. | |
| 8,978,029 B2* | 3/2015 | Schwaninger | G06F 8/61 717/174 |
| 9,152,402 B2* | 10/2015 | Scheidel | G06F 8/61 |
| 9,300,552 B2* | 3/2016 | Dube | G06F 8/20 |
| 9,300,553 B2* | 3/2016 | Dube | G06F 8/20 |
| 9,398,087 B1* | 7/2016 | Hosie | H04L 67/10 |
| 9,508,039 B2* | 11/2016 | Arnold | G06N 5/02 |
| 9,639,338 B2* | 5/2017 | Ruehl | H04L 67/1095 |
| 9,658,842 B2* | 5/2017 | Rowe | G06F 8/60 |
| 9,696,984 B2* | 7/2017 | Zhu | H04L 67/10 |
| 9,998,323 B2* | 6/2018 | Chhatwal | H04L 41/082 |
| 2004/0098706 A1* | 5/2004 | Khan | G06F 8/61 717/120 |
| 2006/0245354 A1* | 11/2006 | Gao | G06F 8/61 370/230 |
| 2007/0157185 A1* | 7/2007 | Semerdzhiev | G06F 8/61 717/148 |
| 2008/0256531 A1* | 10/2008 | Gao | G06F 8/61 717/177 |
| 2009/0222504 A1* | 9/2009 | Vandanapu | G06F 8/61 709/201 |
| 2010/0031247 A1* | 2/2010 | Arnold | G06F 8/61 717/174 |
| 2010/0153941 A1* | 6/2010 | Borissov | G06F 8/65 717/168 |
| 2011/0138047 A1 | 6/2011 | Brown et al. | |
| 2012/0084769 A1* | 4/2012 | Adi | G06F 8/63 717/174 |
| 2012/0290678 A1 | 11/2012 | Dawson et al. | |
| 2013/0218946 A1 | 8/2013 | Colbert et al. | |
| 2014/0129690 A1* | 5/2014 | Jaisinghani | G06F 9/5061 709/222 |
| 2014/0201017 A1 | 7/2014 | Catalano et al. | |
| 2014/0280961 A1 | 9/2014 | Martinez et al. | |
| 2014/0280964 A1 | 9/2014 | Farooq et al. | |
| 2014/0282536 A1 | 9/2014 | Dave et al. | |
| 2014/0337830 A1* | 11/2014 | Schwaninger | G06F 8/61 717/177 |
| 2014/0344006 A1 | 11/2014 | Biazetti et al. | |
| 2014/0365662 A1 | 12/2014 | Dave et al. | |
| 2015/0169291 A1* | 6/2015 | Dube | G06F 8/20 717/101 |
| 2015/0309780 A1* | 10/2015 | Ruehl | H04L 67/1095 717/176 |
| 2015/0312110 A1* | 10/2015 | Dube | G06F 8/20 709/226 |
| 2015/0347096 A1* | 12/2015 | Hanna | G06F 8/36 717/107 |
| 2016/0092194 A1* | 3/2016 | Chhatwal | G06F 8/65 717/170 |
| 2016/0092207 A1* | 3/2016 | Chhatwal | H04L 41/082 717/121 |
| 2016/0139885 A1* | 5/2016 | Dube | G06F 8/20 717/101 |
| 2016/0142265 A1* | 5/2016 | Dube | G06F 8/20 709/223 |
| 2017/0060557 A1* | 3/2017 | Bendelac | G06F 8/60 |

OTHER PUBLICATIONS

Azeez, Afkham, et al. "Multi-tenant SOA middleware for cloud computing." 2010 IEEE 3rd international conference on cloud computing. IEEE, 2010. (Year: 2010).*

Ma, Kun, Bo Yang, and Ajith Abraham. "A template-based model transformation approach for deriving multi-tenant saas applications." (2012). (Year: 2012)*

U.S. Appl. No. 14/538,718, filed Nov. 11, 2014, Quan Binh To, et al.

"AWS CloudFormation User Guide," API Version May 15, 2010, Amazon Web Services, May 2010, pp. 1-741.

* cited by examiner

TEMPLATE GENERATION FOR DEPLOYABLE UNITS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

Many large companies are attempting to move data center resources to cloud computing environments. These companies may use large amounts of desktop computing software that must be procured, kept up-to-date, and distributed across many desktop computers in multiple locations. For a large enterprise, it can be difficult to keep all of the applications they may wish to use up to date using the traditional approach of physically installing applications on each machine. For example, deploying and managing applications at scale is difficult, complex, and requires expensive on premise infrastructure. In addition, updates and patches are complex to deploy without affecting user productivity, and legacy applications typically only run on older operation system versions. It can also be difficult for a large enterprise to deploy applications on-demand and their own line-of-business applications. In many cases, there is a lack of transparency into cost controls, spending and usage related to desktop applications and software services. Therefore, large enterprises can miss opportunities for license synergies across the organization.

For example, within a large enterprise, individual business units often procure their own software and services. When this is not done in a controlled fashion, the resulting sprawl of unapproved products creates compliance risks that administrators have to address. Different organizations have taken a variety of approaches to increase standardization and enforce compliance. Some attempted to address these issues by setting policies centrally, educating users, and relying on them to comply. Often, users had to bear most of the burden for compliance, impacting productivity and increasing risk. Other organizations attempted to address these issues by centralizing control, so that only a small and trusted set of users could have access to the most powerful tools, sacrificing agility and self-service.

Figure 1:
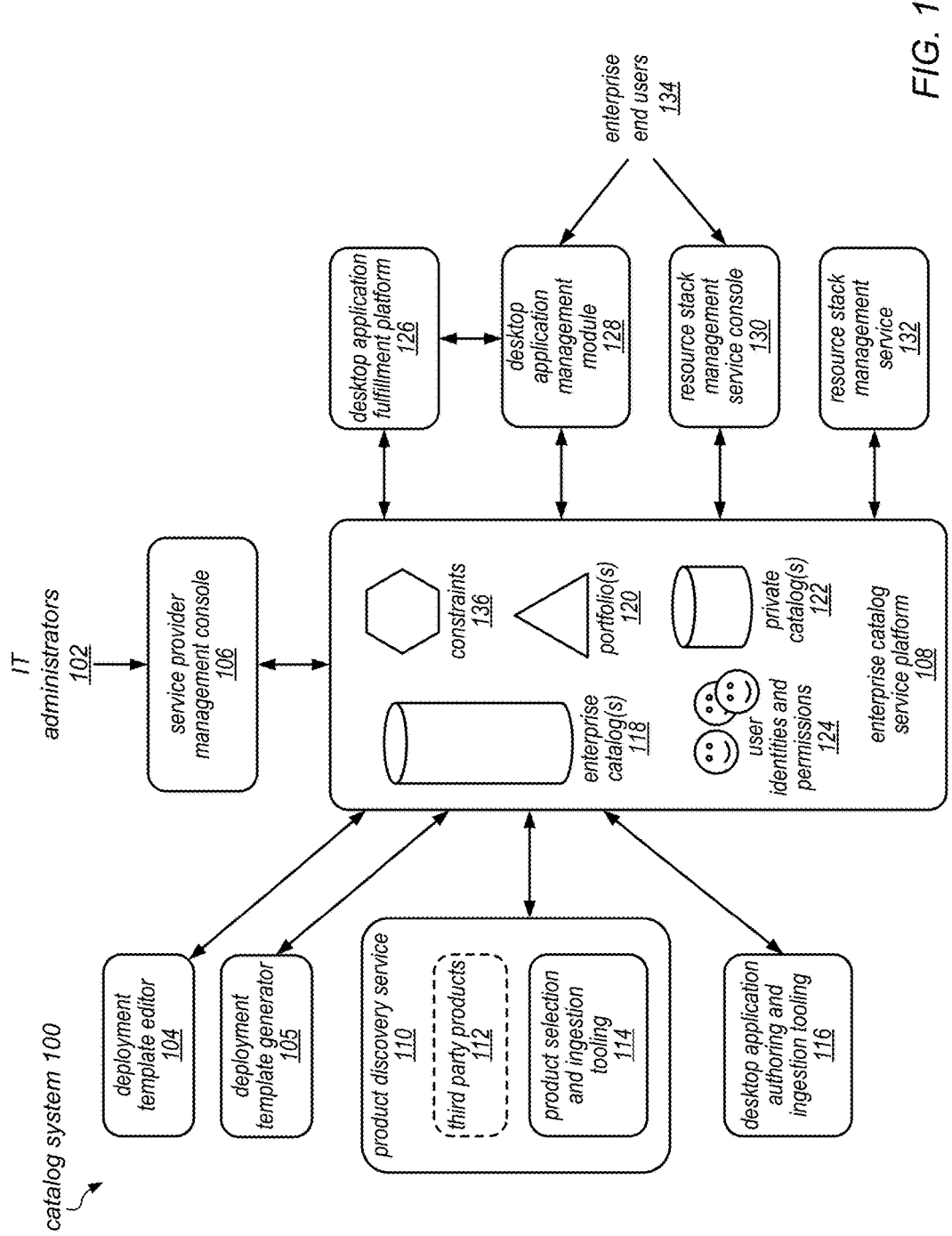
FIG. 1 is a block diagram illustrating one embodiment of a service provider system that is configured to implement an enterprise catalog service.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods, systems, and computer-readable media for template generation for deployable units are described. As described herein, when a deployable unit is submitted to a centralized component such as a catalog system, a deployment template may be generated for the deployable unit. The deployable unit may represent any of various types of machine images, software products, software installers, batch files, or other sets of program instructions. The deployment template may represent directives, constraints, and/or other metadata for deploying the deployable unit. The directives may include commands or instructions to be performed in installing and/or configuring a software product. As an example of a directive, if the deployable unit is an application installer, a directive in the deployment template may represent a command to execute the installer on a virtual machine of a specified instance type and then return a value identifying that virtual machine instance. The constraints may include limitations to be observed in installing and/or configuring a software product. As an example of a constraint, the deployment template may restrict deployment to a specified geographical region.

The deployment template may include a description of the deployable unit, a description of resources of a provider network to which deployment is permissible (e.g., instance types and/or resource types), an indication of the regions of a provider network to which deployment is permissible, an indication of inputs and outputs for deployment, an indication of dependencies on other resources, an indication of suitable parameters for deployment, and/or other suitable metadata. The deployment template for the deployable unit may be generated automatically and/or programmatically based on analysis of the deployable unit and potentially based on user input that is solicited as part of the generation of the deployment template. The deployment template may be added to a service catalog. Upon selection of the deployment template in the service catalog, the deployable unit may be deployed to one or more resources of a multi-tenant provider network based (at least in part) on the deployment template, e.g., by following the directives of the deployment template. In this manner, software products of various types (and potentially of an arbitrary type) may be wrapped in a deployment template and added to a service catalog without the requirement for an administrator or other user to create a deployment template manually.

Catalog Service Platform

The systems and methods described herein for implementing an enterprise catalog service may, in various embodiments, enable administrators within customer organizations to create catalogs and portfolios of software products (e.g., enterprise-wide catalogs, portfolios, and/or other catalogs containing desktop applications and/or server products) and to share them with specific sets of users. For example, through the enterprise catalog service, administrators may be able to offer a standard set of products for common use cases to the end users in their organizations that meet their organizational goals and requirements. In some embodiments, the enterprise catalog service may allow administrators (e.g., IT administrators or buyers) to discover software products, provision service provider resources on which to deploy those software products, and manage those software products through a service provider management console. The use of the enterprise catalog services described herein may benefit customer organizations by increasing standardization, enforcing compliance with organizational policies, reducing the costs of compliance, and improving agility. In some embodiments, once the software products managed by the enterprise catalog service are in use, administrators can track their usage and monitor health through the service, in order to provide the best possible experience for their users.

In some embodiments, end users may access the enterprise catalog service through an end user console to discover software products and provision them for their common use cases. For example, an administrator may define a product once and enable self-service and repeated use by a group of end users. After provisioning the products, users may track their usage, monitor health, and manage the resources through the end user console or through the service provider management console. In one example, a development manager might create a product for a standard development and test environment that will be used by the developers on his team. Each developer can provision and use the development and test environment in a self-service fashion, and then shut it down (de-provision it) when it is no longer needed.

As described above, in some embodiments, administrators may access the enterprise catalog service through a service provider management console to create and manage catalogs or portfolios. Each catalog (e.g., a default or enterprise-wide catalog or one of multiple private catalogs or portfolios that are accessible only by a subset of the end users in the customer organization) and/or portfolio may contains a set of products. The products in any given catalog may all be of the same type or may include products of different types, in different embodiments. For example, a given catalog or portfolio may include one or more desktop applications (e.g., desktop applications packaged as machine images, application binaries or other executable objects), one or more virtualized application packages (e.g., applications packaged for delivery to desktops on physical computing devices and/or one or more virtual desktop instances), or resource stack templates, dependent on configuration settings selected for the catalog/portfolio by the administrator that created it.

The enterprise catalog service may, in some embodiments, provide access to product listings from third parties (i.e., entities other than the service provider customers and the service provider itself). For example, in some embodiments, the enterprise catalog service may include (or provide an interface to) a product discovery service through which administrators and users can discover and/or obtain access to software products that were developed by (or are published and/or sourced by) two or more independent software vendors (ISVs). For example, an administrator in an organization that is a customer of the enterprise catalog service may procure a product through the product discovery service, customize it, configure data protection settings appropriate for the customer organization, and publish it to end users in the customer organization through an enterprise-wide or private catalog that the administrator owns and/or controls. In this way, administrators may be able to not only ingest their own company products but may also be able to find and subscribe to products from external sources. The products ingested by the enterprise catalog service for inclusion in a customer organization's catalog may require paid subscriptions or licensing fees (e.g., fees charged hourly, monthly, annually, or using any other pricing schedule), or may be free for service provider customers and their end users to use.

In some embodiments, desktop applications that are included in a private catalog or portfolio and managed by the enterprise catalog service on behalf of a service provider customer organization may be deployed to end users in the customer organization through an application fulfillment platform that interacts with the enterprise catalog service. For example, an application fulfillment platform may provide on-demand delivery and installation of applications to virtual desktop instances in a cloud computing environment for the benefit of end users (e.g., employees or members of a business, enterprise, or other organization that is a customer of the service provider). In some embodiments, the application fulfillment platform may employ a variety of services to manage collections of desktop applications that are maintained by the enterprise catalog service (e.g., catalogs or portfolios of desktop applications) and to deliver virtualized application packages to end user machines or virtual desktop instances. In some embodiments, end users may access the enterprise catalog service through an end user console of the application fulfillment platform.

As noted above, in some embodiments, customers of a service provider (e.g., buyers or IT administrators within an enterprise) may be able to discover and subscribe to third party desktop applications (or desktop applications that have been purchased or licensed from a third party by the service provider) on-demand and make them available to their end users on virtual desktop instances. In addition, an IT administrator of a customer may be able to publish and manage the customer's own line-of-business desktop applications, which may be accessible only for their end users.

In various embodiments, the application fulfillment platforms described herein may provide IT administrators full control over their virtual desktop instances with dynamic application management tools. For example, IT administrators in customer organizations may be able to build application catalogs or portfolios (e.g., using an enterprise catalog service such as those described herein) for their end users that are composed of applications from sourced through the platform and/or their own private applications, where a portfolio is a collection of applications and corresponding constraints (including maintenance schedules and license types), and that can be assigned to end users or groups of users. Note that as used herein, references to "assigning" a product or portfolio to an end user or to a group of end users may describe actions or operations by which the end user or group of end users is granted permission to install, subscribe to, or launch the product (or the products in the portfolio). In some embodiments, these actions or operations to grant permissions to an end user or group of end users may also be described as "creating an entitlement" to a product or portfolio for an end user or group of end users. In some embodiments, customers may allow their end users to install applications on-demand. IT administrators may interact with the application fulfillment platforms through a management console (sometimes referred to herein as a service provider system console or an administrator console) that offers IT administrators access to the tools for managing catalogs or portfolios (e.g., catalogs or portfolios of desktop applications that are maintained by the enterprise catalog service), application updates, constraints, constraint groups, application licenses and/or their own private applications. The systems described herein may allow customers to efficiently manage their software application spending with detailed usage reports and monthly subscriptions. Because the service provider may be able to negotiate bulk and/or wholesale prices from application vendors, the service provider may be able to offer them to customer (e.g., individually or in bundles containing groups of popular applications) with competitive pricing.

As described herein, application fulfillment platforms may provide a self-service model to end users through an application on their virtual desktop instances. For example, through this application (which is referred to herein as a desktop application management module), end users can discover and manage an application portfolio that best fits their needs, with the ability to install applications marked as optional by their IT administrators. IT administrators may also have the option to authorize their users to be able to request access to additional applications and/or to receive notifications of new applications or application updates as they become available.

Note that in the context of the services described herein, the terms "customer" and "buyer" may refer to an enterprise, a business, or another organization that receives services (e.g., catalog services, application management services, and/or software product fulfillment services) from a service provider on behalf of their end users. In this context, the term "sellers" may refer to software vendors that provide their applications for use within the application fulfillment platforms described herein, and the terms "users" and "end users" may refer to employees or members of the enterprise, business, or other organization that receives services on their behalf from the service provider. In various embodiments, users may access software products that are fulfilled through the platforms and services described herein on their own computing resources instances (e.g., on end user machines and/or virtual desktop instances) or may invoke the execution of server products (e.g., services implemented by resource stacks of service provider resources) on their behalf. Note that in various embodiments, an enterprise catalog service "user" may represent an identity and access management role (e.g., a child account of a root account for a service provider customer or service provider customer organization) or may be an end user in a customer organization (e.g., an active directory user), and the enterprise catalog service may support groups of both of these types of users (e.g., active directory groups or identity and access management groups). Note also that the term "active directory", as used herein, may more generally refer to an active directory, a cloud directory, or another technology for managing users and/or other resources through a directory.

In some embodiments, applications (e.g., desktop applications) may be delivered to various end users' virtual desktop instances using an application virtualization technology that encapsulates and isolates applications in dedicated containers. For example, a packaging service implemented on the application fulfillment platform may be configured to transform applications into virtualized application packages and to deliver them to virtual desktop instances or physical desktops running over an operating system on an end user's machine. The virtualized application packages, when executed, may perform and behave as if they are natively installed, without the need for actual installation.

As described herein, an application fulfillment platform may offer customers (or more specifically, IT administrators of those customers) the ability to provision applications on-demand at scale while maintaining centralized control, security and compliance. For example, in some embodiments, these platforms (and corresponding services thereof) may be integrated with a management console through which the IT administrators may discover and subscribe to a broad selection of applications from a variety of sources, build catalogs and/or portfolios of applications from a variety of sources and having a variety of subscription/licensing models, control access to applications with granular access policy enforcement on a per user basis, manage application updates, access detailed usage reports for their enterprise, application portfolios and end users, and/or monitor real-time installs as well as license activation on a per application basis.

As noted above, the application fulfillment platforms described herein may be integrated with or may be configured to operate in conjunction with an enterprise catalog service, such as those described herein. As described herein, administrators may create catalogs or portfolios of products and resources from a variety of suppliers, and may share them with a specific set of users. These products may include not only desktop applications to be delivered to virtual desktop instances as virtualized application packages, but may also include server products (e.g., server-side applications to be executed on a server on behalf of a customer or end user) and/or applications to be delivered as executable files (e.g., application binaries or machine images) to be installed on an end user's computing device or virtual desktop instance. In some embodiments, once the enterprise catalog service is used to create a catalog or portfolio of desktop applications, these applications may be installed as virtualized application packages by end user at a later time (e.g., on-demand). The integration of the enterprise catalog service with a resource stack management service through which products (e.g., server products) may be defined and deployed is described in more detail below, according to various embodiments.

The enterprise catalog services described herein may be implemented in whole or in part on an enterprise catalog service platform that includes (or operates in conjunction with) various components and services in the service provider network that are used in managing collections of software products on behalf of service provider customer organizations and their end users. For example, the enterprise catalog service platform may include (or provide an interface to) a product discovery service, robust catalog management tools, tools for authoring and managing the lifecycles of products, product listings, and product offerings, a catalog store (e.g., an indexed, revision-controlled document store where all products and offers are mastered), a lifecycle system responsible for validation, approval, and promotion workflow steps, and a catalog publishing system.

Terminology

In the context of the enterprise catalog services described herein, the term "product" may refer to any resource (e.g., a machine image, resource stack template, desktop application binary or virtualized application package) that has been prepared for consumption by other users and that may be included in a catalog of such resources or listed in a portfolio of such resources. Products may be ingested by an enterprise catalog service through the IT administrator console and, once added to a catalog or portfolio, may be fulfilled (which may also be referred to as being launched) by end users through an end user console. In various embodiments, actions that can be taken on a product may include one or more of the following:

1. Create
2. Read
3. Update (e.g., change aspect metadata, add a version, or change accessibility)
4. Publish views
5. Sunset a product or version thereof In the context of the enterprise catalog services described herein, the term "offer" may refer to a contract that captures terms of use, which may include pricing information. An offer can reference multiple products (e.g., a bundle). The phrase "pricing information" may refer to a collection of terms or a way of pricing. As with products, changes to offers (which may include sunsetting an offer) may be tracked across multiple immutable revisions. In some embodiments, the actions that can be taken on an offer may include the following:

1. Create
2. Read
3. Update (Change price, Change availability, Change accessibility)
4. Publish views In the context of the enterprise catalog services described herein, the term "listing" may refer to a human readable view of a combination of products and offers. There may be different ways to present a listing, in different embodiments, the goal of which is to allow administrators, buyers and/or end users to make informed purchase decisions from a specific business context. Ratings, and reviews, and recommendations may also be included in (or associated with) listings. Listings may be mutable and may be consolidated, in some embodiments. Various enterprise catalog service APIs associated with listings are shown below.

In the context of the enterprise catalog services described herein, the term "subscription" may refer to a record of an agreement of an offer by a user. This agreement entitles a user to the products specified in the chosen terms of the offer. Additional parameters of the terms may also be collected in a subscription. In some embodiments, the actions that can be taken on a subscription may include the following:

1. Create
2. Read
3. Update (Renew, End)

In the context of the enterprise catalog services described herein, an entitlement may be a collection of allowed product actions for each user. In some embodiments, the actions that can be taken on an entitlement may include the following:

1. Create, Update, Delete (private)
2. Read

In the context of the enterprise catalog services described herein, an approval may be a workflow that must happen before one or more of the previously described actions on a product can be taken. For example, an approval workflow may be invoked in response to an end user request to subscribe to a product and/or for permission to consume the product.

In various embodiments, the enterprise catalog service may expose a variety of APIs (some of which may not exposed to customers or end users). For example, in some embodiments the enterprise catalog service may expose any or all of the following APIs for use in managing catalogs and/or portfolios of software products on behalf of customer organizations and their end users.

DescribeListings
DescribeListingVersions
PutListing
CreateListing
UpdateListing
CreatePortfolio
ImportPortfolio
UpdatePortfolio
DescribePortfolios
DeletePortfolio
ListPortfolios
PutPortfolioAccessPolicy
RemovePortfolioAccessPolicy
ListPortfolioAccessPolicies
DescribePortfolioAccessPolicies
PutConstraint
RemoveConstraint
ListConstraints
DescribePortfolioConstraints
AddPortfolioListings
RemovePortfolioListings
SearchListings DescribeListingFilters
BrowseListings
GetLaunchContexts Enterprise Catalog Service Architecture From the standpoint of a high level software architecture, a service provider platform that implements an enterprise catalog service such as those described herein may include the following components: a catalog service, a service catalog runtime, an inbox service, a resource stack management service, one or more administrator/management consoles, and one or more end user consoles, each of which may provide a portion of the functionality of the enterprise catalog service. The catalog service may be the core storage and version control mechanism for the enterprise catalog service. IT administrators may create and publish products and product versions that are stored in the catalog service, and IT administrators create portfolios and assign products to portfolios. Catalog information, portfolios and association between catalogs or portfolios and products may be stored in the catalog service. The service catalog runtime may be responsible for fulfilling products (e.g., products defined using resource stack templates). The service catalog runtime may also provide support for "managed services" whereby the end-user does not have access to the service provider resources that are created when deploying a product.

In some embodiments, an inbox service may allow various service provider services to send targeted, actionable "messages" to users e.g., (administrators or end users). The inbox service may define the notion of an InBox as a target for such messages. The inbox service may allow administrators to define who has access to various messages and where notifications are sent when messages arrive in a particular InBox. In some embodiments, the enterprise catalog service may uses the resource stack management service as the underlying fulfillment engine for server products. In various embodiments, one or more administrator/management consoles may provide graphical user interfaces for creating and managing products and portfolios, and one or more end user consoles may provide graphical user interfaces for launching and managing products.

Note that in some embodiments, a workflow service may be used to run workflows to complete various tasks in conjunction with the enterprise catalog service, the application fulfillment platform, or the resource stack management service. For example, in some embodiments, there may be a separate workflow for each operation performed on a resource stack. In a specific example, when a call is made to launch a resource stack, a "LaunchStack" workflow (e.g., one that is specific to that combination of user and resource stack name) may be created to monitor and harvest any information from the resource stack. The workflow service may also provide a synchronization mechanism to ensure that only certain operations are being performed at the same time (for example, prevent an update operation from starting if the target resource stack is still in the process of being created).

FIG. 1 is a block diagram illustrating a portion of a service provider system that implements an enterprise catalog service, according to at least one embodiment. The system includes an enterprise catalog service platform through which IT administrators within service provider customer organizations (e.g., enterprises that receive computing services from the service provider) can manage catalogs and/or portfolios of desktop applications and/or server products, as well as usage policies (e.g., constraints on the use of those desktop applications and/or server products) for their end users. As illustrated in FIG. 1, catalog system 100 may include an enterprise catalog service platform 108 (which may embody both a catalog service and a service catalog runtime, such as those described above) that is configured to create and manage one or more enterprise catalogs 118, private catalogs 122 and/or portfolios 120 on behalf of service provider customers and their end users. Note that, in some embodiments, at least some of private catalogs 122 may represent logical collections of products to which a respective end user or other principal has access (each of which may include products that are included in one or more portfolios 120). As described in more detail herein, an IT administrator 102 may interact with the enterprise catalog service platform 108 through a service provider management console 106 to create a desktop application, resource stack template, or resource stack instance; to select, ingest, and/or package desktop applications and server products for subsequent use by some or all of their end users; create collections of products (e.g., desktop applications and/or server products), such as enterprise-wide catalogs, private catalogs, or portfolios); assign products or collections of products to end users and/or end user groups (e.g., end users or end user groups having particular user identities and/or permissions 124); apply various constraints 136 on the use of the products; and/or set other configuration parameter values for the products or collections of products.

As illustrated in this example and described in more detail herein, there may be multiple methods for an IT administrator to add products to catalogs and/or portfolios and make them available for deployment to end users. For example, system 100 may include a deployment template editor 104. In various embodiments, IT administrators, end users, or third party software providers (e.g., independent software vendors) may create deployment templates using deployment template editor 104 for products (e.g., server products) that may be uploaded directly to enterprise catalog service platform 108 or that may (if subsequently published) be discovered and ingested by the enterprise catalog service through product discovery service 110. Deployment templates may also be referred to herein as resource stack templates and may represent directives, constraints, and/or other metadata for deploying software products. System 100 may also include a desktop application authoring and ingestion tooling component 116. In various embodiments, IT administrators, end users, or third party software providers (e.g., independent software vendors) may create desktop applications using desktop application authoring and ingestion tooling component 116 that may (if subsequently published as a machine image, application binary, or other executable application package) be discovered and ingested by the enterprise catalog service through product discovery service 110. For example, in some embodiments, IT administrators or end users in a service provider customer organization may create and upload customer-specific desktop applications (e.g., line-of-business applications) through desktop application authoring and ingestion tooling component 116.

As another example, system 100 may include a deployment template generator 105. In various embodiments, IT administrators 102, end users 134, or third party software providers (e.g., independent software vendors) may submit deployable units to the catalog system 100, and the system 100 (using, e.g., the deployment template generator 105) may generate deployment templates for the deployable units. As discussed above, deployment templates may also be referred to herein as resource stack templates and may represent directives, constraints, and/or other metadata for deploying software products. A deployable unit may represent any of various types of machine images, software products, software installers, batch files, or other sets of program instructions. The deployment template may include a description of the deployable unit, a description of resources of a provider network to which deployment is permissible (e.g., instance types and/or resource types), an indication of the regions of a provider network to which deployment is permissible, an indication of inputs and outputs for deployment, an indication of dependencies on other resources, an indication of suitable parameters for deployment, and/or other suitable metadata.

Using the template generator 105, the deployment template for the deployable unit may be generated automatically (e.g., without the need for user intervention) and/or programmatically (e.g., by execution of program instructions) following the submission of the deployable unit to the catalog system 100. In one embodiment, the template may be generated based on inspection or other analysis of the deployable unit, e.g., based on the type of deployable unit. In one embodiment, the template may be generated based on user input that is solicited (e.g., through the management console 106) from an administrator or other submitter of the deployable unit. By permitting the generation of templates in this manner, manual template creation (e.g., using the template editor 104) may be avoided unless it is desired by administrators 102. In one embodiment, the deployment templates generated using the template generator 105 may be added directly to enterprise catalog service platform 108 by the generator 105 or may (if subsequently published) be discovered and ingested by the enterprise catalog service through product discovery service 110. After being generated and added to the enterprise catalog service platform 108, the deployment templates produced by the template generator 105 may be treated in substantially the same manner as the templates produced using the template editor 104.

In some embodiments, product discovery service 110 may provide an interface through which third party products 112 (e.g., server products or desktop applications that have been published and/or packaged for potential ingestion by the enterprise catalog service) can be discovered. Product discovery service 110 may include a product selection and ingestion tooling component 114, which may be configured to retrieve and/or package products that are discovered through the product discovery service interface or that are uploaded through the product selection and ingestion tooling component 114, in different embodiments. In various embodiments, the products ingested by the enterprise catalog service may be leased and/or licensed by the service provider and/or by service provider customers for the benefit (and use) of end users in the service provider customer organizations.

In some embodiments, when a product (e.g., a desktop application or resource stack template for a product) is selected by an IT administrator 102 and ingested by enterprise catalog service, it may be placed in a default catalog for the customer organization (such as enterprise catalog 118). The IT administrator 102 may then add it to one or more private catalogs 122 or portfolios 120, or may assign it directly to one or more user end users or end user groups having particular user identities and/or permissions 124. Similarly, when a server product instance is created (e.g., when a resource stack is constructed according to a resource stack template), it may be placed in the default catalog. The IT administrator 102 may then add it to one or more private catalogs 122 or portfolios 120, or may assign it directly to one or more end users or end user groups having particular user identities and/or permissions 124. Note that any constraints 136, groups of constraints, or configuration parameters that are selected for various products by the IT administrator (e.g., during their creation, ingestion, or addition to a particular catalog) may be applied to the products when they are added to other catalogs and/or portfolios. In some embodiments, these constraints, groups of constraints, or configuration parameters may be modified when they are added to other catalogs and/or portfolios, and/or additional constraints, groups of constraints, or configuration parameters may be applied to the products when they are added to other catalogs and/or portfolios to further restrict access to those products by end users or to further restrict the use of those products by end users who are authorized to access them.

As described in more detail herein, the products that are managed on behalf of service customer organizations by the enterprise catalog service implemented by system 100 (and, more specifically, by enterprise catalog system platform 108) may be deployed to end users through other components and services implemented by the service provider (e.g., on physical and virtual computing resources that are located and/or hosted on the service provider's network). For example, desktop applications may be deployed to desktops on various end users' physical devices and/or on virtual desktop instances (e.g., in response to requests from the end users to install, subscribe to or launch them) through desktop application fulfillment platform 126. In another example, product instances may be constructed from resource stack templates (e.g., in response to requests from end users or IT administrators to deploy the services provided by the resource stacks) by resource stack management service 132.

In various embodiments, the end users of a service provider customer (shown as enterprise end users 134 in FIG. 1) may access products (e.g., desktop applications and/or services) through various client applications (e.g., end user consoles). For example, FIG. 1 illustrates an embodiment in which enterprise end users 134 access desktop applications (including those that are managed on behalf of their organizations by the enterprise catalog service) through a desktop application management module 128, and in which end users 134 access server products (including those that are managed on behalf of their organizations by the enterprise catalog service) through a resource stack management service console 130. For example, end users 134 may log into desktop application management module 128 in order to request delivery of, to subscribe to, to unsubscribe from, to install, to uninstall, to launch, or to otherwise manage a particular desktop application (one that may or may not be included in a catalog to which the end user currently has access), or may log into resource stack management service console 130 in order to construct a resource stack instance from a resource stack template (on service provider resources), or request access to a service provided by a resource stack instance that has been constructed (on service provider resources) from a corresponding resource stack template (a service that the end user may or may not currently be authorized to launch). In some embodiments, when requests are received from end users 134 for desktop applications or services that are managed by the enterprise catalog service, they may initiate various workflows of enterprise catalog service platform 108, desktop application fulfillment platform 126 and/or resource stack management service 132 that may or may not result in the end users 134 receiving the requested product access (e.g., depending on various access management policies, constraints, or permissions that apply to the product and/or the end users).

Note that while the example system illustrated in FIG. 1 includes a single service provider management console 106 through which IT administrators 106 interact with the enterprise catalog service platform to perform all IT administrator functions and includes multiple end user consoles (e.g., one for end user functions directed to desktop application management and another for end user function directed to server product management), in other embodiments, a system that implements an enterprise catalog service may include two different management consoles (e.g., one through which desktop applications are managed by IT administrators and another through which server products are managed by IT administrators), rather than a single management console. In still other embodiments, the system may include a single end-user console through which end users manage both desktop applications and server products, rather than two different end-user consoles. In still other embodiments, a system that includes an enterprise catalog service platform, such as that described herein, may be configured to manage and deploy software products other than resource-stack-based products and desktop applications, and/or may deploy software products for consumption by end users through more, fewer, or different deployment platforms than those illustrated in FIG. 1 as desktop application fulfillment platform 126 and resource stack management service 132. Similarly, in other embodiments, a system that includes an enterprise catalog service platform, such as that described herein, may be configured to ingest software products of types other than resource-stack-based products and/or desktop applications, and/or may include (or interact with) more, fewer, or different ingestion mechanisms than those illustrated in FIG. 1 as deployment template editor 104, product discovery service 110, and desktop authoring and ingestion tooling 116.

Although not shown in the example in FIG. 1, the enterprise catalog service may include an interface to (or otherwise work in conjunction with) various data stores or data storage services (e.g., a data storage service implemented by the service provider or an external data storage service). In one embodiment, the documents associated with a product may be stored in an object storage service, and the console (or customer) may be responsible for uploading these documents to system-defined locations through various enterprise catalog service APIs. In this example, the service catalog runtime may pass the location of the documents to the catalog service, and the identity and access management (IAM) role used to upload the documents may be stored by the catalog service. In some embodiments, data about running stacks may be persisted in a database service. In various embodiments, application state data for virtualized desktop applications may be persisted in either an object storage service or a database service.

Figure 12:
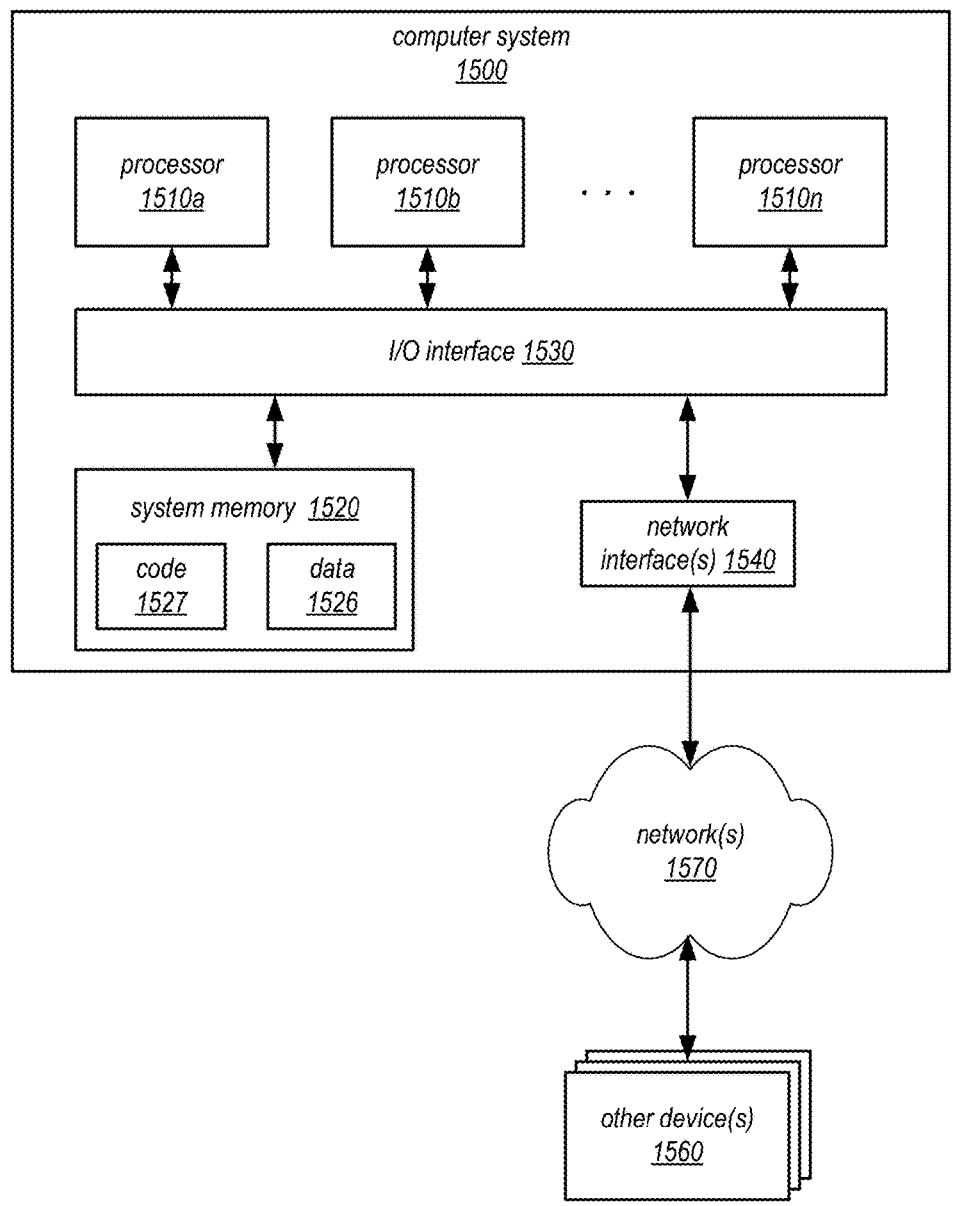
FIG. 12 is a block diagram illustrating an example computer system that implements some or all of the techniques described herein, according to different embodiments.

The systems and methods described herein may be implemented on or by one or more computing systems within a network environment, in different embodiments. An example computer system on which embodiments of the techniques described herein for managing and deploying desktop applications and services through an enterprise catalog service may be implemented is illustrated in FIG. 12. Embodiments of various systems and methods for implementing these techniques are generally described herein in the context of a service provider that provides to clients, via an intermediate network such as the Internet, virtualized resources (e.g., virtualized computing and storage resources), software products, and computing services (including desktop applications and server products) implemented on a provider network of the service provider. FIG. 1, FIG. 2, FIG. 4, FIG. 7, and FIG. 12 (and the corresponding descriptions thereof) illustrate and describe example computing systems and environments in which embodiments of the systems and methods described herein may be implemented, and are not intended to be limiting. In at least some embodiments, at least some of the resources provided to clients of the service provider via the provider network may be virtualized computing resources implemented on multi-tenant hardware that is shared with other client(s) and/or on hardware dedicated to the particular client. Each virtualized computing resource may be referred to as a resource instance. Resource instances may, for example, be rented or leased to clients of the service provider. For example, clients of the service provider may access one or more services of the provider network via application programming interfaces (APIs) to the services to obtain and configure resource instances and to establish and manage virtual network configurations that include the resource instances, for example virtualized private networks.

In some embodiments, the resource instances may, for example, be implemented according to hardware virtualization technology that enables multiple operating systems to run concurrently on a host computer, i.e. as virtual machines (VMs) on the hosts. A hypervisor, or virtual machine monitor (VMM), on a host may present the VMs on the host with a virtual platform and monitors the execution of the VMs. Each VM may be provided with one or more private IP addresses; the VMM on a host may be aware of the private IP addresses of the VMs on the host.

Example Provider Network Environment

This section describes an example provider network environment in which embodiments of the methods described herein may be implemented. However, this example provider network environment is not intended to be limiting. In various embodiments, in such provider network environments, a service provider may host virtualized resource instances on behalf of a customer that can be accessed by end users. For example, end users who are associated with the customer on whose behalf the virtualized resources instances are hosted (e.g., members of the same organization or enterprise) may be able to access the virtualized resources instances using client applications on client devices. In some embodiments, the virtualized resources instances may be configured to implement virtual desktop instances.

In some embodiments, desktop applications that are included in catalogs managed by an enterprise catalog service such as those described herein may be delivered to and/or deployed, installed or executed on virtualized computing resources (e.g., virtual computing resource instances implemented on service provider hardware in a cloud computing environment), rather than on physical client computing devices. In addition, products (e.g., server products) that are included in catalogs managed by an enterprise catalog service may be implemented as resource stacks (e.g., stacks of service provider resources) that collectively provide a service. These service provider resources may also include virtualized computing resources, such a virtual computing node instances implemented on service provider hardware in a cloud computing environment. An example service provider network that provides virtualized computing resources for these and other uses is illustrated in FIG. 2 and described below.

Figure 2:
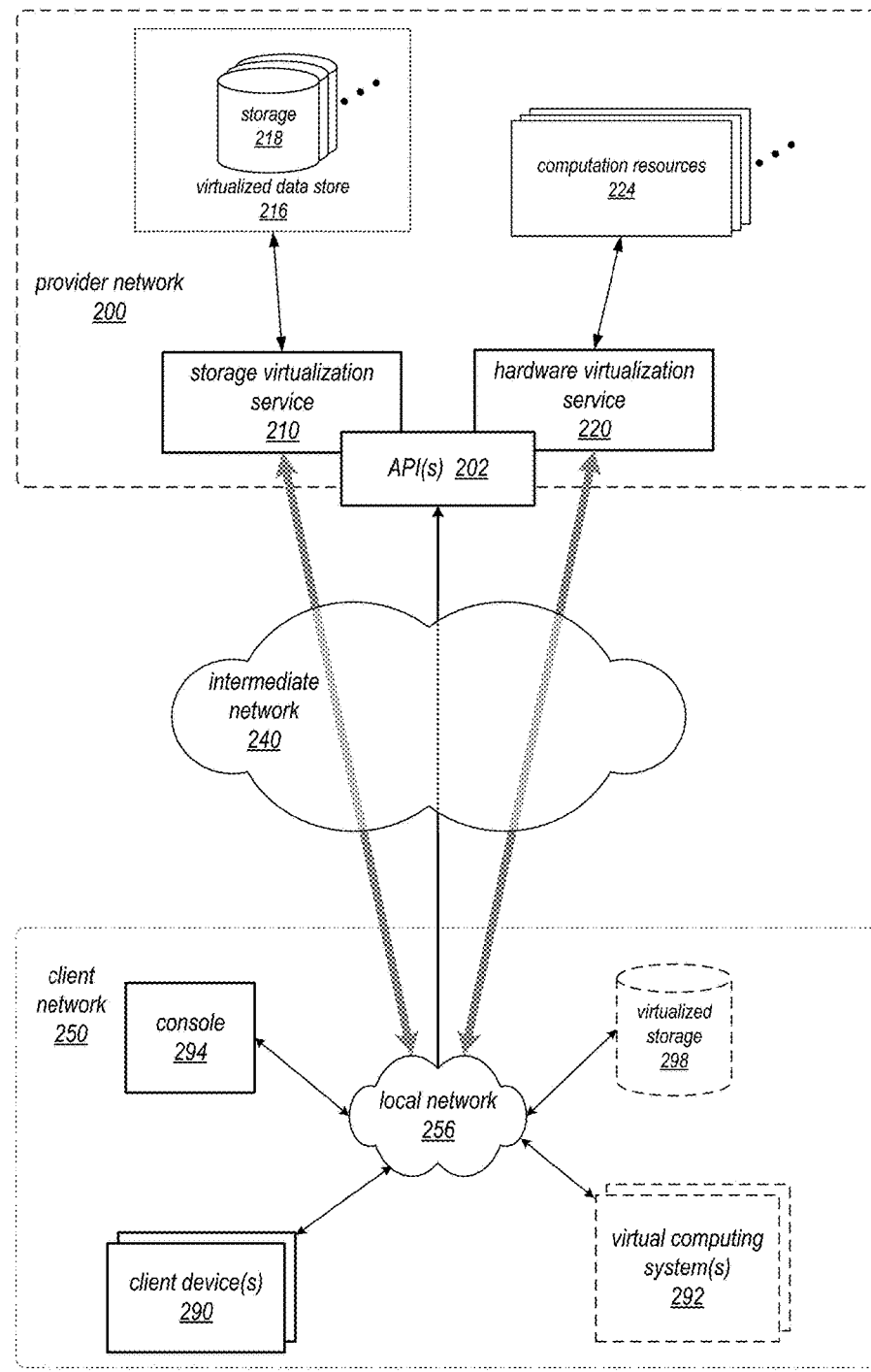
FIG. 2 is a block diagram illustrating an example provider network that provides a storage virtualization service and a hardware virtualization service to clients, according to at least some embodiments.

FIG. 2 is a block diagram of an example provider network environment, one that provides a storage virtualization service and a hardware virtualization service to clients, according to at least some embodiments. In this example, hardware virtualization service 220 provides multiple computation resources 224 (e.g., VMs) to clients. The computation resources 224 may, for example, be rented or leased to clients of the provider network 200 (e.g., to a client that implements client network 250). As noted in the previous example, in some embodiments, provider network 200 may also provide application virtualization for the benefit of its customers and their end users (e.g., through a packaging service), and may provide on-demand delivery of desktop applications to desktops on physical computing devices and/or virtual desktops through an application fulfillment platform implemented using various resources of service provider network 200. In this example, each computation resource 224 may be provided with one or more private IP addresses. Provider network 200 may be configured to route packets from the private IP addresses of the computation resources 224 to public Internet destinations, and from public Internet sources to the computation resources 224.

Provider network 200 may provide a client network 250, for example coupled to intermediate network 240 via local network 256, the ability to implement virtual computing systems 292 via hardware virtualization service 220 coupled to intermediate network 240 and to provider network 200. In some embodiments, hardware virtualization service 220 may provide one or more APIs 202, for example a web services interface, via which a client network 250 may access functionality provided by the hardware virtualization service 220, for example via a console 294. In at least some embodiments, at the provider network 200, each virtual computing system 292 at client network 250 may correspond to a computation resource 224 that is leased, rented, or otherwise provided to client network 250.

From an instance of a virtual computing system 292 and/or another client device 290 or console 294, the client may access the functionality of storage virtualization service 210, for example via one or more APIs 202, to access data from and store data to a virtual data store 216 provided by the provider network 200. In some embodiments, a virtualized data store gateway (not shown) may be provided at the client network 250 that may locally cache at least some data, for example frequently accessed or critical data, and that may communicate with virtualized data store service 210 via one or more communications channels to upload new or modified data from a local cache so that the primary store of data (virtualized data store 216) is maintained. In at least some embodiments, a user, via a virtual computing system 292 and/or on another client device 290, may mount and access one or more storage volumes 218 of virtual data store 216, each of which appears to the user as local virtualized storage 298.

While not shown in FIG. 2, the virtualization service(s) may also be accessed from resource instances within the provider network 200 via API(s) 202. For example, a client, appliance service provider, or other entity may access a virtualization service from within a respective private network on the provider network 200 via an API 202 to request allocation of one or more resource instances within the private network or within another private network. Note that in some embodiments, the hardware virtualization service 220 may be configured to provide computation resources 224 that have been configured to implement a virtual desktop instance, which may appear to the user as a local desktop (implemented by a virtual computing system 292). Note also that in some embodiments, the computation resources 224 that are made available to the client via hardware virtualization service 220 may include multiple network interfaces. For example, some of them may include one network interface for communicating with various components of client network 250 and another network interface for communicating with computation resources or other network entities on another network that is external to provider network 200 (not shown).

In some embodiments, a service provider network that implements VMs and VMMs may use Internet Protocol (IP) tunneling technology to encapsulate and route client data packets over a network substrate between client resource instances on different hosts within the provider network. The provider network may include a physical network substrate that includes networking devices such as routers, switches, network address translators (NATs), and so on, as well as the physical connections among the devices. The provider network may employ IP tunneling technology to provide an overlay network via which encapsulated packets (that is, client packets that have been tagged with overlay network metadata including but not limited to overlay network address information for routing over the overlay network) may be passed through the network substrate via tunnels or overlay network routes. The IP tunneling technology may provide a mapping and encapsulating system for creating the overlay network on the network substrate, and may provide a separate namespace for the overlay network layer (public IP addresses) and the network substrate layer (private IP addresses). In at least some embodiments, encapsulated packets in the overlay network layer may be checked against a mapping directory to determine what their tunnel substrate target (private IP address) should be. The IP tunneling technology may provide a virtual network topology overlaid on the physical network substrate; the interfaces (e.g., service APIs) that are presented to clients are attached to the overlay network so that when a client resource instance provides an IP address to which packets are to be sent, the IP address is run in virtual space by communicating with a mapping service that can determine where the IP overlay addresses are.

In various embodiments, client resource instances on the hosts may communicate with other client resource instances on the same host or on different hosts according to stateful protocols such as Transmission Control Protocol (TCP) and/or according to stateless protocols such as User Datagram Protocol (UDP). However, the client packets are encapsulated according to an overlay network protocol by the sending VMM and unencapsulated by the receiving VMM. A VMM on a host, upon receiving a client packet (e.g., a TCP or UDP packet) from a client resource instance on the host and targeted at an IP address of another client resource instance, encapsulates or tags the client packet according to an overlay network (or IP tunneling) protocol and sends the encapsulated packet onto the overlay network for delivery. The encapsulated packet may then be routed to another VMM via the overlay network according to the IP tunneling technology. The other VMM strips the overlay network encapsulation from the packet and delivers the client packet (e.g., a TCP or UDP packet) to the appropriate VM on the host that implements the target client resource instance. In other words, in some embodiments, although there may be a single underlying physical network in the service provider computing environment (e.g., the service provider data center), the encapsulations described herein may allow it to appear as if each client application (or each client resource instance on which one or more client applications execute) is running on its own virtual network (e.g., data packets for multiple client applications may be traveling on the same physical network but it may appear as if the traffic directed to each of the client applications is traveling on a private network).

In some embodiments, the overlay network may be a stateless network implemented according to a connectionless (or stateless) IP protocol. In some such embodiments, the sending VMM sends the encapsulated packet onto the overlay network for routing and delivery, but does not receive an acknowledgement (ACK) or other response regarding delivery of the packet. In other embodiments, the VMM may receive an ACK or other response regarding delivery of an encapsulated packet.

In some embodiments, while there are physical computers executing client applications and other processes described herein, the client applications may be running as virtual machines on the physical computers. For example, internal processes of the cloud computing environment that are configured to manage the creation of these virtual machines, to provision resources for these virtual machines, and/or to perform other administrative tasks on behalf of clients and/or their applications (e.g., monitoring resource usage, customer accounting, billing for services, etc.) may execute in a control plane layer (or hypervisor) in the cloud computing environment. By contrast, client applications (e.g., each resource instance that implements an application component) may execute in a data plane layer of the cloud computing environment. Underneath these layers, there may be only one physical network card for each host node (or for multiple host nodes), in some embodiments, but each resource instance may execute as if it has its own network (e.g., a virtual network). In some embodiments, each resource instance may have its own data plane network connection(s), but may make local API calls (e.g., calls to a component on the same node) without needing to rely on these data plane network connections.

In some embodiments, the cloud computing environment may be a multi-tenant environment in which each application (and/or each virtual private network) may have its own namespace. In some embodiments, each client may have its own allocation of network connectivity and/or throughput capacity (bandwidth). For example, the network connectivity and/or throughput capacity in the data plane network may be provisioned (e.g., designated or reserved) for the use of various clients. In various embodiments, a service provider may employ one of the example provider networks described above (or another suitable provider network environment) to implement a hosted desktop service in a cloud computing environment. In such embodiments, a customer may access the provider network in the cloud computing environment to request the instantiation and/or configuration of one or more virtual desktop instances in the cloud, and may then provide access to those virtual desktop instances to one or more end users (e.g., through a client application). For example, an administrator within an organization or enterprise may set up an account with a service provider, or may contract with the service provider to set up some number of virtual desktop instances, and (once the virtual desktop instances are set up), may provide credentials for accessing these virtual desktop instances. In this example, once the virtual desktop instances have been set up and credentials have been provided, one or more end users may launch a client application on their a client device (e.g., a computer, tablet device, or other mobile device) and enter the credentials for the virtual desktop instance, after which they may be logged into a virtual desktop environment. Although the virtual desktop environment is implemented by virtualized resource instances in the cloud computing environment, it may appear to the end user as if it were a local desktop and it may operate as if it were an independent computer to which the user is connected. In some embodiments, the virtual desktop environment may provide access to productivity software and other software programs to which the user would typically have access if the user were logged onto a physical computer owned by the organization or enterprise. In at least some embodiments, an application fulfillment platform of the service provider may be configured to provide on-demand delivery of applications (e.g., as virtualized application packages) to virtual desktop instances, as described herein. Note that these applications may or may not be stand-alone applications. For example, in some cases, each of the virtual desktop instances (and/or the applications running thereon) may be part of the active directory framework of the organization or enterprise and may be able to access shared files or other resources on the existing network of the organization or enterprise once the credential presented by the user upon logging into the virtual desktop instance have been authenticated.

Figure 3:
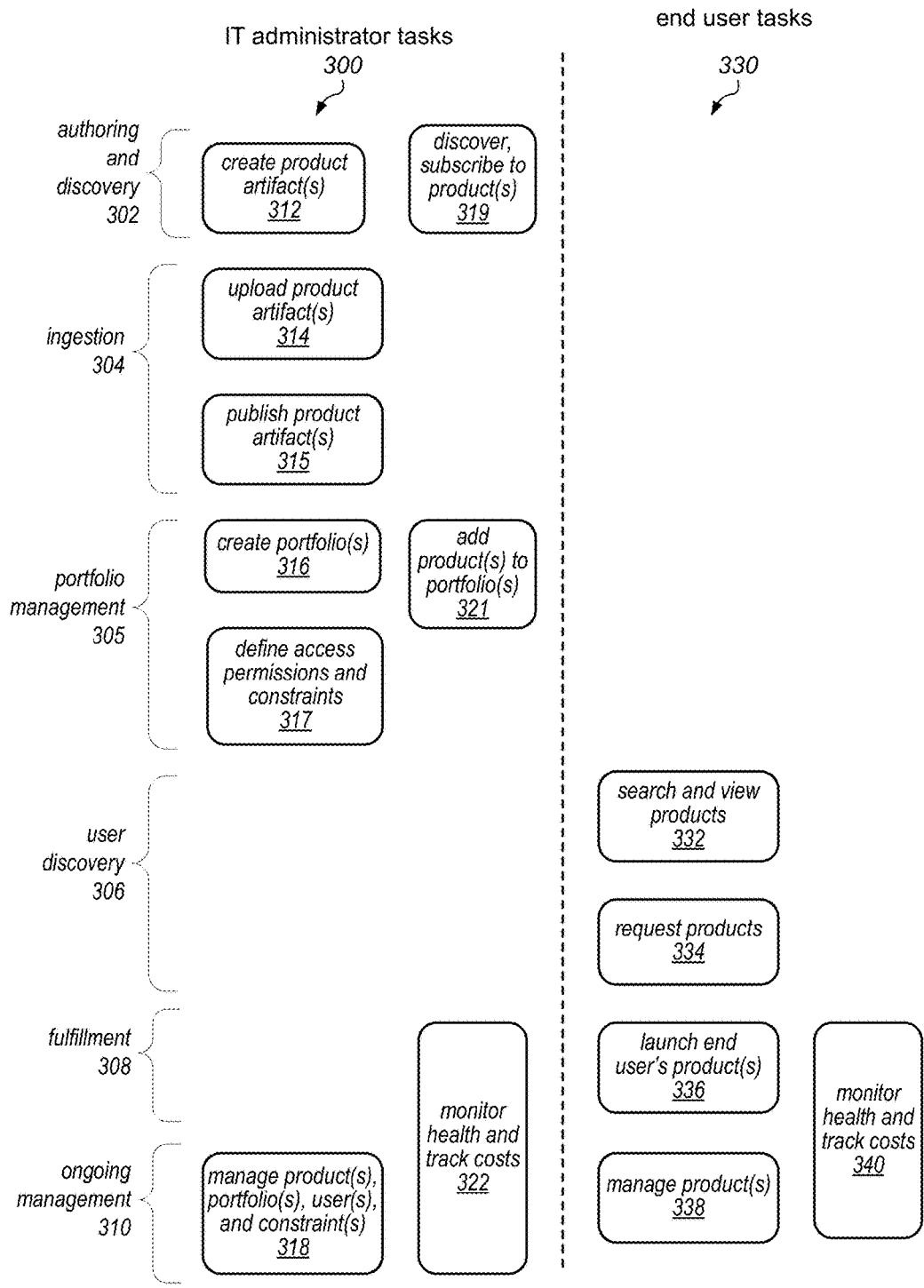
FIG. 3 illustrates tasks that may be performed by an IT administrator and other tasks that may be performed by an end user during different phases of product deployment through an enterprise catalog service, according to at least some embodiments.

In some embodiments, the types of interactions experienced by different users that access the enterprise catalog services (and enterprise catalog service platforms) described herein may be thought of as being divided into multiple phases, where each phase may include tasks that are performed by an IT administrator of a service provider customer organization and/or tasks that are performed by an end user in the customer organization. For example, FIG. 3 illustrates tasks that may be performed by an IT administrator (shown as IT administrator tasks 300) and other tasks that may be performed by an end user (shown as end user tasks 330), according to at least some embodiments. Note, however, that in some embodiments, an IT administrator may be able to perform some or all of the tasks shown as end user tasks 330. In such embodiments, the IT administrator may perform various ones of the end user tasks 330 on behalf of an end user, on their own behalf, or on behalf of the customer organization as a whole. As illustrated in this example, during a product authoring and discovery phase (shown as authoring and discovery phase 302), an IT administrator may create the artifacts for a product to be offered by the enterprise catalog service using appropriate product-specific tools (shown as task 312). In various embodiments, this task may include creating a machine image for a software product, creating a resource stack template, prompting or assisting the automatic generation of a resource stack template, or packaging a desktop application for delivery to desktops on physical computing devices and/or virtual desktop instances. During this phase, the IT administrator may also discover one or more products that are available to be managed by the enterprise catalog service on behalf of the IT administrator's organization, and may subscribe to one or more of those products on behalf of the end users in the IT administrator's organization (shown as task 319). In various embodiments, during this phase (or during an ingestion phase described below), an IT administrator may (through an administrator or management console of the enterprise catalog service) be able to add additional information for a product listing (e.g., a product listing for a newly authored product or for one that was discovered by the IT administrator), such as a detailed product description, a logo to brand the product, version information and/or tags (which may be used to identify and characterize the product, or may be used in identity and access management policies to allow or deny access to the product or to restrict the operations that can be performed by IAM users, groups, and roles).

As illustrated in FIG. 3, during an ingestion phase (shown as ingestion phase 304), and administrator may upload a product artifact that was created during authoring phase 302. For example, the IT administrator may upload a machine image for a software product, a resource stack template, or a packaged desktop application to the enterprise catalog service platform (shown as task 314) and publish the machine image, resource stack or packaged desktop application to one or more enterprise catalogs, private catalogs or portfolios (as in task 315). During a portfolio management phase (shown as portfolio management phase 305), the IT administrator may create one or more portfolios (shown as task 316) and may add one or more products that were authored, uploaded, and published by the IT administrator (as in tasks 312, 314, and 315) or that were discovered and subscribed to by the IT administrator (as in task 319) to those portfolios (shown as task 321). During this phase, the IT administrator may also define one or more access management policies and/or constraints to be applied to the product and/or to the portfolios to which the products have been added (as in task 317). For example, in some embodiments, the constraints may include business level input parameters (such as an input parameter specifying the number of users to support or whether certain types of data need to be stored), or may include infrastructure-level input parameters (such as an input parameter specifying the type of virtualized computing resource instance should be used).

As illustrated in this example, during a user discovery phase (shown as user discovery phase 306), an end user within the customer organization may discover one or more products by searching an enterprise-wide catalogs (if the end user has permission to view the enterprise-wide catalog) or their own private catalog (e.g., a logical collection of the products that the end user has permission to discover and/or launch, including any products that are included in portfolios to which the end user has been granted access), and viewing details pages that provide information about the products (as in task 332) and may request access to one or more products (as in task 334). During a fulfillment phase (shown as fulfillment phase 308), the end user may launch one or more of the products in their private catalog (as in task 336) and begin monitoring their state (which may include real-time monitoring of the health of the product and/or tracking costs associated with the provisioning and use of the product (as in task 340). Note that, in some embodiments, IT administrators and/or other decision makers may be required to approve a request to discover or launch a product prior to the end user being allowed to discover and/or launch the requested product. In this phase, the IT administrator may also begin monitoring the state of various products that have been provisioned by (or on behalf of) end users in the customer organization (which may include real-time monitoring the health of the products provided to the end users and/or tracking costs associated with the provisioning and use of the products provided to the end user), as in task 322. For example, in some embodiments, an IT administrator and/or an end user may be able to view a list of products that are currently in use along with their health (e.g., through the administrator/management console or through an end user console). In some embodiments, the product health for a product built using a resource stack template may be determined according to various alarms that are defined in the template.

As illustrated in FIG. 3, during an on-going management phase (shown as on-going management phase 310), both end users and IT administrators may continue to monitor the health of various products and to track costs associated with the provisioning and use of the products (as in tasks 322 and 340). The IT administrators may also manage those products, as well as any portfolios in which they are contained and/or any constraints or users/permissions that are associated with those products (as in task 318). For example, in some embodiments, managing the products may include enforcing any access management policies and/or constraints that were defined for the products and/or to the enterprise catalogs, private catalogs, or portfolios to which the products were published. During this phase, end users may manage their own list of products (as in 338). For example, end users may add or remove products but may not modify their configurations (e.g., any applicable constraints or permissions). Also note that, in some embodiments, the IT administrator may continue to search for and discover new products, to subscribe to them, and to add them to new or existing portfolios and that the end user may continue to discover and request access to products and/or to launch products to which the end user has been granted access (e.g., by repeating various ones of the tasks illustrated in FIG. 3) during the ongoing management phase 310 (not shown).

Note that in some embodiments, a product (or a particular version of a product) may be deprecated by an IT administrator (e.g., through the administrator/management console of the enterprise catalog service). In such embodiments, when a particular version of a product is deprecated, which may also be referred to as "sunsetting", a notification may be sent to all end users that have previously provisioned that version of the product. In some embodiments, end users who previously provisioned (and are currently using) a product version that has been (or is about to be) sunsetted may continue to use that product version unless, for example, an IT administrator determines that it is a security risk and revokes access to that product version for all end users. However, a product version that has been (or is about to be) sunsetted may not be available to any other end users (e.g., end users who have not previously provisioned that product and/or are not currently using it). In some embodiments, once an end user stops using a product version that has been (or is about to be) sunsetted, the end user may no longer have access to that product version. Note also that new product versions may be created in the same way that new products are created (e.g., through the administrator/management console of the enterprise catalog service). In some embodiments, when a new version of a product is published to a catalog or portfolio, a notification may be sent to all users that have provisioned previous versions of the product. Creating a new version of a product may not affect any existing versions of the product that are currently in use.

Figure 4:
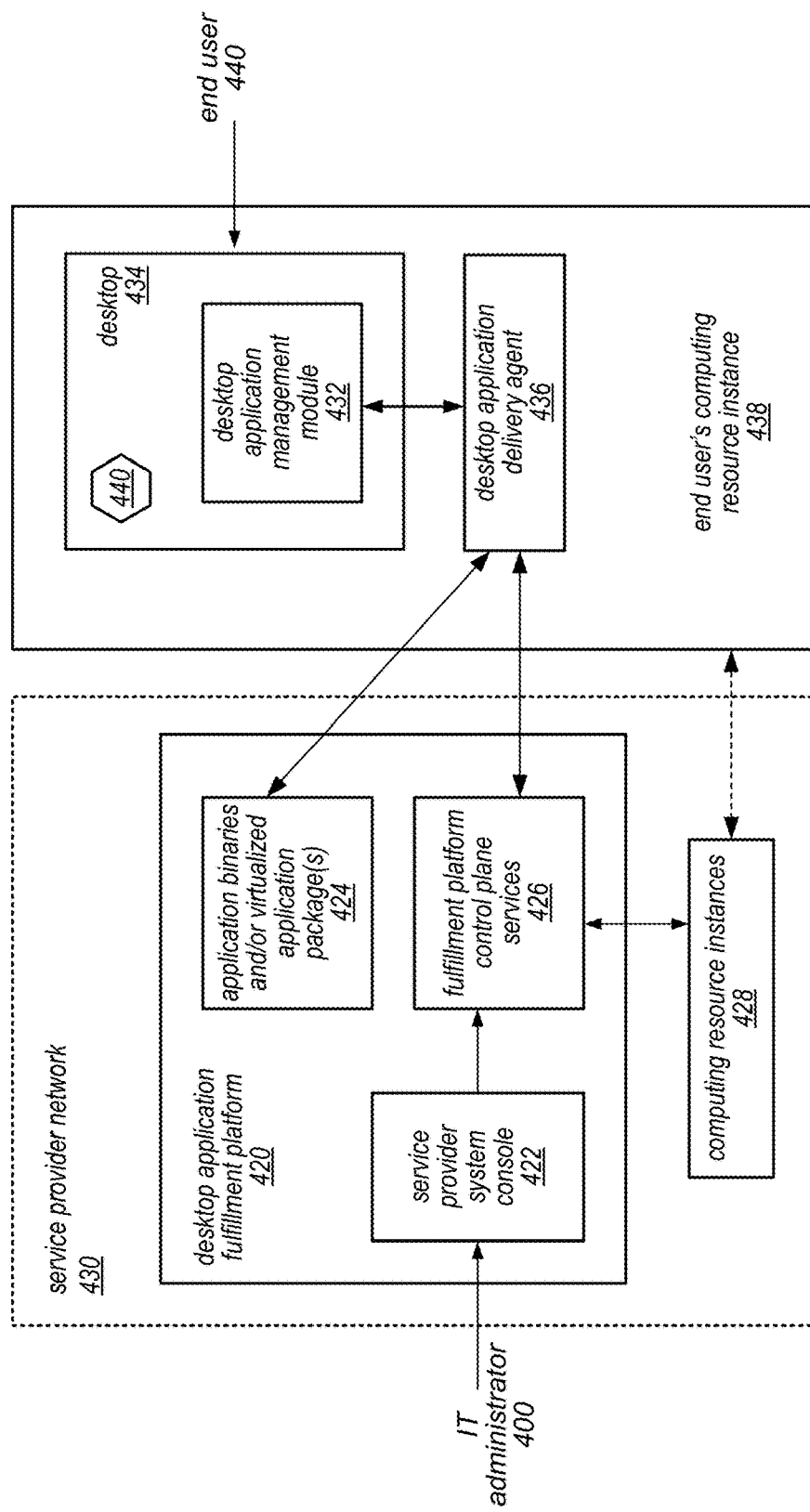
FIG. 4 is a block diagram illustrating one embodiment of a service provider system that is configured to provide on-demand delivery of applications to computing resource instances of its customers' end users.

One embodiment of a service provider system that is configured to provide on-demand delivery of applications (e.g., desktop applications) to computing resource instances of its customers' end users is illustrated by the block diagram in FIG. 4. As illustrated in this example, the system, implemented on service provider network 430, may include an application fulfillment platform (shown as desktop application fulfillment platform 420). The application fulfillment platform may include an interface mechanism (shown as service provider system console 422) through which an IT administrator of a service provider customer (e.g., a business, enterprise, or organization that receives computing services, storage services, and/or access to second or third party applications from the service provider) can manage the fulfillment of various applications to their end users (e.g., employees or members of the same business, enterprise, or organization). For example, the IT administrator may log into desktop application fulfillment platform 420 (e.g., through a browser or a dedicated client-side application) to access service provider system console 422. The IT administrator may then provide input (e.g., requests for service entered in a graphical user interface of service provider system console 422) in order to create a catalog of applications to be provisioned for the use of their end users, to assign applications to particular end users or user groups, or to generate, obtain, or view usage reports for the applications in the catalog by their end users.

As illustrated in this example, desktop application fulfillment platform 420 may include multiple fulfillment platform control plane services 426, various ones of which may be invoked in response to the inputs received from the IT administrator. For example, in response to inputs specifying the addition of an application to a catalog and the assigning of the application to one or more users, a "create fulfillment" workflow may be initiated, which may include operations performed by a fulfillment service, an entitlement service, a delivery service, a packaging service, a device identifier service, and/or a proxy service. As illustrated at 424, in this example, applications may be delivered to end users as application binaries (e.g., desktop applications that have been prepared for physical installation on an end user's computing resource instance) and/or as virtualized application packages. For example, in some embodiments, the service provider may (e.g., when ingesting desktop applications for the benefit of its customers and their end users) transform desktop applications into virtualized application packages to be delivered to end users' computing resource instances, and those virtualized application packages may be executed on those computing resource instances without the end user having to install the desktop applications themselves on those computing resource instances. In some embodiments, application binaries and/or virtualized application packages may be delivered according to deployment templates that represent directives, constraints, and/or other metadata for deployment.

In some embodiments, an application delivery agent (such as desktop application delivery agent 436 illustrated in FIG. 4) and a desktop application management module (such as desktop application management module 432) may be installed on the end user's computing resources instance 438. In various embodiments, computing resource instance 438 may be a physical computing device (e.g., a desktop or laptop computer, a tablet computing device, or a smart phone) or may be a virtualized computing resource instance (e.g., one that implements a virtual desktop instance). Desktop application delivery agent 436 (which may be a client component of desktop application fulfillment platform 420) may be configured to communicate with various fulfillment platform control place services 426 in order to fulfill requests to subscribe to, install, and/or execute applications selected through desktop application management module 432 or through another user interface mechanism (e.g., application icon 440 on desktop 434 or a start menu item). In other words, desktop application management module 432 is an application that may be installed on the end user's computing resource instance 438 to allow the end user to interact with desktop application fulfillment platform 420 through desktop application delivery agent 436. In some embodiments, desktop application delivery agent 436 may include a runtime engine component that is configured to execute the instructions of a virtualized application package 424 that is delivered (e.g., using demand paging) for a selected application. The functionality of an application delivery agent is described in more detail below, according to at least some embodiments.

As illustrated in FIG. 4, the service provider network may include physical and/or virtualized computing resource instances (e.g., computation resource instances and/or storage resource instances) that may be provisioned on behalf of the business, enterprise, or organization (and its end users). In some embodiments, these computing resources instances (shown as computing resource instances 428 on service provider network 430) may be configured to implement a remote computing application that allows end users to access applications executing on computing resource instances 428 as if they were installed and executing locally on their machine. For example, in some embodiments, one or more of these computing resources instances 428 may be configured to implement a virtual desktop instance (which may serve as the end user's computing resource instance 438) on which a desktop application delivery agent 436 and a desktop application management module 432 are installed. In such embodiments, desktop 434 in FIG. 4 may represent a view presented by the virtual desktop instance and may appear to the end user as if it were a desktop on the end user's local (physical) computing device. In some embodiments, service provider network 430 may also include storage resources outside of desktop application fulfillment platform 420 (which may be managed by a storage service implemented within service provider network 430) that are configured to store data utilized by desktop application fulfillment platform 420 (not shown). In various embodiments, application binaries, virtualized application packages, various tables that store information about applications and collections thereof, application state data, or other information used to provide on-demand delivery of desktop applications to end users may be stored outside of desktop application fulfillment platform 420 instead of, or in addition to, within desktop application fulfillment platform 420.

As illustrated in this example, desktop application management module 432 (through which the end user may select applications for installation or execution) may execute on the end user's computing resource instance 438, and a graphical user interface of desktop application management module 432 may be displayed on desktop 434. For example, this interface may present a list of applications for selection by the end user (e.g., in order to subscribe to, install, and/or execute an application). In addition, a shortcut or icon for an application (shown as element 440 in FIG. 4) may be displayed on desktop 434 and may be selected in order to launch the corresponding application (e.g., desktop application management module 432, or one of the applications delivered for execution on computing resource instance 438 in response to its selection, by the end user, within desktop application management module 432).

As described above, in some embodiments, an enterprise catalog service may operate in conjunction with (or may provide an interface to) a resource stack management service (such as resource stack management service 132 illustrated in FIG. 1). This service may help service provider customers (e.g., administrators and/or end users) model and set up service provider resources on which products (e.g., server products) may run within the service provider network. Through a resource stack management service console (such as resource stack management service console 130), administrators may create or prompt the automatic generation of a resource stack template that describes all of the service provider resources required for a particular task or product (such as virtualized computing resource instances and/or database instances). Once the resource stack template is created, either manually or automatically, the resource stack management service may take care of provisioning and configuring those resources for the customer. Other resources that may be defined in a resource stack template include an auto-scaling component, a load balancer, or an additional storage service instance. Once a resource stack is no longer needed, it may be deleted, which deletes all the resources in the stack. In addition, a resource stack template may be modified by editing the definition or by creating a new version of the template that includes a different definition. For example, a resource stack template may be modified in order to include a higher performing computing resource instance type or to add additional storage resources.

As previously noted, an enterprise catalog service may operate in conjunction with (or provide an interface to) a resource stack template tool that may be accessed by an IT administrator or end user in a customer organization (e.g., through an administrator/management console or through an end user console such as resource stack management service console 130) to create a collection of interdependent resources that form a resource stack. The resource stack management service, enterprise catalog service, or another service provider service or platform may maintain and manage a catalog of resources that can be included in a resource stack.

In one embodiment, an IT administrator or end user in a customer organization may create, select, or otherwise specify a template that defines a resource stack. In one embodiment, an IT administrator or end user in a customer organization may submit a deployable unit such as a software product, and the catalog system 100 may generate a resource stack template for the submitted deployable unit, potentially with minimal or no further user input. The resource stack may comprise resources available from the service provider. The resource stack template may also include information about how the resources are to be linked together in the resource stack and how the resources are to be configured. When a resource stack is created, it may be created in accordance with the information contained in the resource stack template. For example, creating a server product from a resource stack template may include determining the dependencies between the resources and an order in which the resources should be instantiated (e.g., provisioned using service provider resources), dependent on the resource stack template. After successful provisioning and integration of the resources, the resource stack may be enabled for use.

In one example, at a newspaper company, in order to enable all of the reporters to have their own blogs, an IT administrator may make them all end users under the organization's service provider account. The IT administrator may access the enterprise catalog service (e.g., through an administrator/management console), through which the IT administrator may subscribe to a blog publishing package (server product), create a catalog or portfolio, add the blog publishing package to the catalog/portfolio, and then grant access the blog publishing package to each of the end users (reporters). In this example, when the end users (reporters) access the catalog/portfolio (e.g., through the end user console), they would see the blog publishing package as an application that they can deploy. For example, an end user may select the blog publishing package (e.g., as an icon or shortcut), in response to which the resource stack management service may deploy the machine image for the blog publishing package (which may also include a database instance or other storage resource instance in addition to a computing resource instance). Once the blog publishing package has been deployed, the end user may begin using it to create their own blogs (blogs over which they have control). In some embodiments, the IT administrator may constrain the use of the blog publishing package, e.g., only allowing development on a computing resource instance of a certain size (e.g., a small instance with limited computing power), rather than on a larger computing resource instance (even if those are available to the newspaper company through their service agreement with the service provider). In another example, the IT administrator may be able to limit the amount of storage that each end user can consume (e.g., 10 Gb per end user).

In this example, for every blog that is launched by one of the end users (reporters), the enterprise catalog system may generate billing information for the IT administrator. For example, the IT administrator may be billed monthly for whatever number of blogs were launched during that month and for the use of the underlying service provider resources (e.g., computing resource instances and storage resource instances). In some embodiments, the service provider may collect usage fees from the customer organization and then pass along payments to any third party vendors from whom an application or server product was sourced. For example, in one embodiment, the service provider may keep fees associated with the hardware resources and/or virtualized computing resource instances on which the server product (e.g., a resource stack application) runs (i.e., fees for the use of the service provider's infrastructure), and a percentage of the fees associate with the application, passing the bulk of the fees collected for use of the server product (e.g., by one or more organizations and their end users) to the appropriate third party vendor(s), e.g., monthly or on any other suitable billing schedule. Note that, in some embodiments of the systems and services described herein, for software products sourced by third party vendors, there may be flexibility in the way that any applicable taxes on the software products or services are collected and paid (e.g., allowing collection by the service provider and/or payment to the appropriate taxing authority by the third party vendor, the IT administrator, or the service provider). There may also be some flexibility in which entity gets to set the prices charged to the customer for software products that are sourced by third party vendors (e.g., the service provider or third party vendor), with options for the service provider to bundle multiple software products together from different vendors and offer them to customers with discounted pricing.

In some embodiments, in order for the enterprise catalog service (or an underlying enterprise catalog service platform) to manage the ingestion, configuration, deployment, and on-going management of different types of software products (which are sourced from different independent software vendors or other entities) for end users who consume them on a variety of deployment platforms, the enterprise catalog service may maintain metadata of several different types for each of the software products that are available for deployment through the service, and the types of metadata maintained for the software products may vary by product type, by target system, or by source (e.g., by vendor). For example, for each of the software products, the enterprise catalog service may be configured to store (and subsequently use, e.g., for display purposes, for deployment purposes, or for determining pricing) the same combination of metadata elements or a different combination of metadata elements, which may include metadata elements reflecting any or all of the following types of information: offer information, a license type, subscription or licensing terms, a product format, resource requirements, an indication of the vendor or other sourcing entity, entitlement information, information indicating any constraints that are associated with a product, portfolio, or user, access management information, or information indicating one or more portfolios in which the product is included). In some embodiments, the metadata maintained for each of the software products may be dependent on the source of the product or on other characteristics of the product. For example, offer information (which may include a pricing type, a price, and/or taxing information for a specified product) may be maintained for products obtained from third party vendors, but not for the customer organization's own line-of-business products. In some embodiments, the metadata may include multiple offers for similar products from different sources, or one more than one offer for a single product, but not all of the offers may be discoverable by administrators or end users. In some embodiments, the metadata maintained for each of the software products may be filtered or sorted so that only products that an administrator or end user has permission to view/discover are presented and/or only a particular subset of the metadata maintained for those products is presented. For example, the enterprise catalog service may be configured to present only the technical details or business information that an administrator or end user needs to know and/or has permission to view. In one example, there may be three different offers for a particular software product: a three day free trial offer, a regular offer, and a volume discount offer, but the information that is presented to an administrator or end user may be sorted or filtered so that only the offers that the administrator or end user is eligible to receive can be viewed by the administrator or end user. In some embodiments, the enterprise catalog service may be configured to filter or sort the metadata that is maintained for various software products in order to present similar information to an administrator or end user (e.g., for use in comparing the products), even if the metadata maintained for the products is not of exactly the same type or format.

In some embodiments, the enterprise catalog service may be configured to take specific actions in response to changes to the specific metadata elements that are maintained for a particular software product. For example, if an offer for a software product changes, the service may be configured to apply the change immediately or after a delay, depending on the change. In this example, if the price goes down (e.g., if a new offer is available for the product that includes a lower price), the service may modify the offer that is received by an existing customer right away (or at the end of the next billing cycle). However, if the price goes up (e.g., if a current offer for the product is replaced by an offer in which the price is higher), the service may allow an existing customer to use the current offer for some period of time (e.g., 90 days) before notifying the customer of the change and/or modifying the offer through which the customer receives the product. In some embodiments, in addition to maintaining (and acting upon) different types of metadata for different software products, the enterprise catalog service may be configured to apply different packaging and/or software integration processes or mechanisms when ingesting or deploying products of different types or from different sources, which may include translating or otherwise transforming the products (or the product packages in which they are delivered) into a format that is suitable for ingestion by the enterprise catalog service from different vendors or for deployment to different or end user systems (e.g., systems that employ different hardware resources or operating systems).

Template Generation

Figure 5:
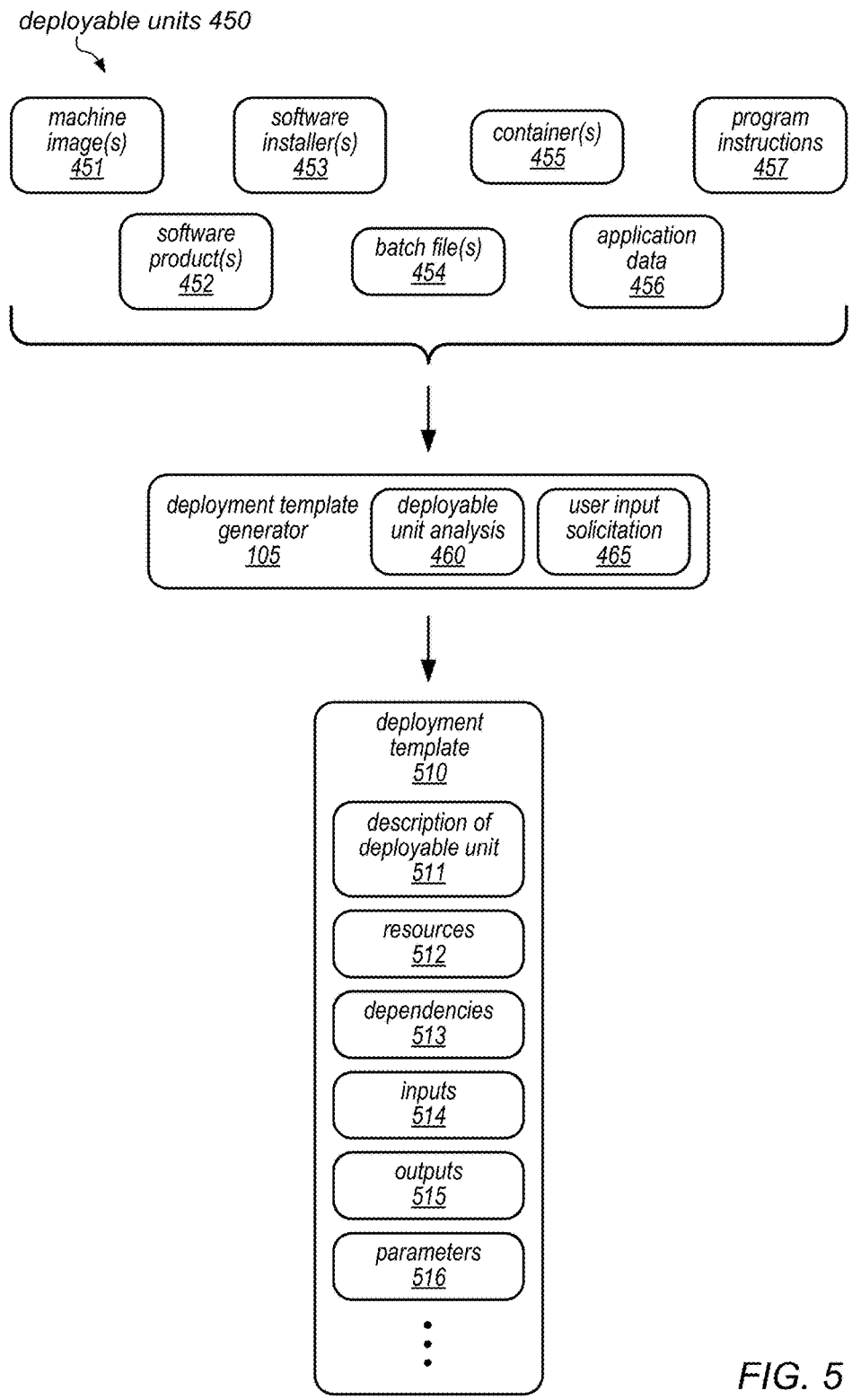
FIG. 5 illustrates the generation of a deployment template for a variety of types of deployable units, according to at least some embodiments.

FIG. 5 illustrates the generation of a deployment template for a variety of types of deployable units, according to at least some embodiments. As discussed above, the deployment template generator 105 may generate deployment templates for deployable units that are submitted to the catalog system 100. A deployable unit may be submitted to the catalog system 100 by an IT administrator 102, e.g., through the service provider management console 106 or any other suitable interface. Submission of a deployable unit may involve submission of a link or pointer to the deployable unit or submission of the deployable unit itself. Deployment templates may also be referred to herein as resource stack templates and may represent directives, constraints, and/or other metadata for deploying software products. It is contemplated that the deployment template generator 105 may generate deployment templates for a wide variety of types of software products referred to herein as deployable units 450. Software products may include various types of executable program code and other program instructions. Software products may include application data that, when ingested or used as input by a software application, causes modification of the behavior or configuration of that application.

For example, the deployable units 450 may include one or more machine images 451 that represent the information required to launch a virtual computing instance, e.g., in a multi-tenant provider network, including information such as an operating system, an application server, and one or more applications, along with launch permissions and a block device mapping that specifies the volumes to attach to the instance when it is launched. As another example, the deployable units 450 may include one or more software products 452 that represent executable binaries of applications or application packages. Additionally, the deployable units 450 may include one or more software installers 453 that represent executable instructions for installing software products or encapsulate installation instructions with the software product itself. Furthermore, the deployable units 450 may include one or more batch files 454 that represent scripts or other sequences of commands to be performed by an operating system on a compute node. The deployable units 450 may include one or more containers 455, also referred to as virtualized containers, which use application virtualization technology to encapsulate and isolate applications in dedicated containers. The deployable units 450 may also include sets of application data 456 representing non-executable data that, when ingested or used as input by a software application, causes modification of the behavior or configuration of that application. For example, the application data 456 may include configuration settings that cause a change in the configuration of an application.

In general, the deployable units 450 may include any suitable sets of program instructions 457 that can be executed or otherwise implemented on a resource (including a computing resource, a storage resource, a database resource, a network resource, and other suitable resources) of a multi-tenant provider network 200. In one embodiment, the deployment template generator 105 may generate deployment templates for deployment units of arbitrary or unknown types. For some types of deployable units, the template generator 105 may have little to no knowledge of the attributes of the deployable unit. For other types of deployable units, the template generator 105 may have a great deal of knowledge of the attributes of the deployable unit. The generation of a deployment template 510 may vary depending upon the amount of knowledge that the template generator 105 has for the particular type of deployable unit.

Using the deployment template generator 105, the deployment template 510 for the deployable unit may be generated automatically (e.g., without the need for user intervention) and/or programmatically (e.g., by execution of program instructions) following the submission of the deployable unit to the catalog system 100. The deployment template generator 105 may generate deployment templates based on any suitable data source(s). In some embodiments, the deployment template generator 105 may generate a deployment template based on multiple data sources. The data source(s) used by the deployment template generator 105 may vary based on the type of deployable unit. In general, the data sources may include the deployable unit itself (e.g., metadata internal to the deployable unit or otherwise associated with the deployable unit), metadata received from an administrator or other submitter of the deployable unit, and metadata (including configuration data) of other resources to be used in deployment of the deployable unit.

As illustrated in FIG. 5, the deployment template generator 105 may include a component for deployable unit analysis 460. In one embodiment, at least a portion of the deployment template 510 may be generated based on inspection or other analysis of the deployable unit. For example, the deployable unit analysis component 460 may initially inspect the deployable unit to determine its type (e.g., a particular type of machine image, software product, software installer, or batch file). The type of the deployable unit may be determined using internal metadata of the deployable unit itself or a file type or file extension of the deployable unit. In one embodiment, the type of the deployable unit may instead be specified by an administrator when the deployable unit is submitted. However, the type of the deployable unit may also be verified using the deployable unit analysis 460. In some embodiments, further analysis of the deployable unit may be performed based on the determined type of the deployable unit. For a deployable unit whose type is well understood by the deployment template generator 105, the deployable unit analysis component 460 may further inspect the contents of the deployable unit or of related resources to determine additional metadata for use in the deployment template 510. For example, the additional metadata that may be determined by the deployable unit analysis 460 may include the configuration of an underlying resource that represents a necessary condition for deployment of the deployable unit. The additional metadata may represent an identifier and/or characteristics of a target resource (such as a virtual computing instance, storage instance, or database instance).

As illustrated in FIG. 5, the deployment template generator 105 may include a component for user input solicitation 465. In one embodiment, at least a portion of the deployment template 510 may be generated based on user input that is solicited (e.g., through the management console 106) from an administrator or other submitter of the deployable unit. The user input may be solicited through the service provider management console 106 or any other suitable interface. For example, a "wizard" or other interface tool may be presented in a user interface to solicit metadata in particular categories for use in generating the deployment template 510. The interface tool may vary based on the type of the deployable unit. Different interface tools may be used to solicit user input representing different types of additional metadata for different types of machine image, different types of software products, different types of software installers, or different types of batch file. For example, the additional metadata that may be determined by the user input solicitation 465 may include the configuration of an underlying resource that represents a necessary condition for deployment of the deployable unit. The additional metadata may represent an identifier and/or characteristics of a target resource (such as a virtual computing instance, storage instance, or database instance).

The deployment template 510 may represent directives, constraints, and/or other metadata for deploying the deployable unit in one or more resources of a provider network 200. The contents of the deployment template 510 may include human-readable alphanumeric text as expressed in a structured format such as JSON (JavaScript Object Notation) or XML (eXtensible Markup Language). The deployment template 510 may not include a deployable unit itself but may include references to the deployable unit and to other resources used in the deployment. The deployment template 510 may include a plurality of different components or sections. In one embodiment, at least some of the components may be ordered within the deployment template 510 such that earlier-positioned components may be performed or implemented before later-positioned components. As illustrated in FIG. 5, examples of components within the deployment template 510 may include a description 511 of the deployable unit, a description of resources 512 of a provider network to which deployment is permissible or supported, an indication of one or more dependencies 513 on other resources, an indication of inputs 514 for deployment, an indication of outputs 515 for deployment, and an indication of suitable parameters 516 for deployment. In various embodiments, some of the components 511-516 may be optional while others may be required. For example, the description 511 and resources 512 may be required components, and the other components 513-516 may be optional.

In one embodiment, the deployment template 510 may include a description 511 of the deployable unit. The description 511 may include a human-readable summary of the deployable unit and the resources used for deployment, e.g., for listing in the service catalog. The description 511 may also include other components such as a product name or name of the deployable unit. In one embodiment, the deployment template 510 may include a description of resources 512 of a provider network that are associated with the deployable unit. In one embodiment, the resources 512 may specify particular resources, such as particular resource types and/or instance types, to which deployment is permissible or supported. The resources 512 may indicate default values and allowable values for one or more instance types and/or one or more resource types of computing resources (e.g., virtual computing instances), database resources, storage resources, network resources, and other suitable types of resources. In one embodiment, the deployment template 510 may also include an indication of the regions of a provider network to which deployment is permissible. It is anticipated that deployment will fail if it is attempted for unsupported types of resources or regions. The deployment template 510 may include actions to be taken or values to be returned upon failure of an attempted deployment.

In one embodiment, the deployment template 510 may include an indication of one or more dependencies 513 on other resources. The dependencies 513 may indicate that deployment of the deployable unit may be successful only in a particular context, such as the existing deployment of another software product, system, or resource, or a particular configuration thereof. For example, the dependencies 513 may indicate that a virtual computing instance must first be provisioned, and the output from that operation may represent an identifier of the instance that is then used as the input for the deployment of a particular software product or software installer. It is anticipated that deployment will fail if the dependencies 513 are not met.

In one embodiment, the deployment template 510 may include an indication of one or more inputs 514 for deployment. The inputs 510 may represent sources of data for use in the deployment, such as particular storage locations or service calls to make to obtain deployment-related data. In one embodiment, the deployment template 510 may include an indication of one or more outputs 515 for deployment. The outputs 515 may represent values to be returned upon termination of the deployment process. The outputs 515 may include values to be returned upon successful deployment and/or values to be returned upon unsuccessful deployment. For example, an output may be generated representing a particular storage location in a particular storage service on which deployment is performed. As another example, an output may be generated representing a particular instance identifier of a virtual computing instance on which deployment is performed.

In one embodiment, the deployment template 510 may include an indication of one or more parameters 516 for deployment. The parameters 516 may include options that may be selected for a particular deployment. For example, if autoscaling of resources is enabled for the deployable unit, then the parameters 516 may include a range of values between one and three for the autoscaling group, and any value within that range may be selected for a particular deployment. The deployment template 510 may also include any other suitable metadata that may be useful in deploying a deployable unit. For example, the deployment template 510 may include scripts or commands to be executed during deployment. The deployment template 510 may include identity and access management (IAM) roles that may be used in deployment. The deployment template 510 may include custom sections for particular types of deployable units, such as machine images, database instances, and other types of resources, and the custom sections may include resource-specific parameters. The deployment template 510 may be used for updating, reconfiguration, or version management of deployable units and other resources of a provider network. The deployment template 510 may be used for removal or deprovisioning of deployable units and other resources of a provider network.

In general, the deployment template 510 may specify the resources that will be used to execute a software product (represented by the deployable unit) on behalf of an end user of a service provider customer and a set of metadata for the resource stack. For example, the resources may include one or more compute node instances (or other modules) that will be used to execute the server application, a set of database instances that will store the data processed by the server, and load balancers for distributing request traffic or other resources. The metadata may include configuration files (which may contain the identities and/or setting for various resources of the resource stack), connectivity/dependencies, user identity and/or permissions information, alarms, tags, or other information. The resource stack may comprise resources available from the service provider. The deployment template (also referred to as a resource stack template) may also include information about how the resources are to be linked together in the resource stack and how the resources are to be configured. When a resource stack is created, it may be created in accordance with the information contained in the deployment template. For example, creating a server product from a deployment template may include determining the dependencies between the resources and an order in which the resources should be instantiated (e.g., provisioned using service provider resources), dependent on the deployment template.

By permitting the generation of templates in this manner, manual template creation (e.g., using the template editor 104) may be avoided unless it is desired by administrators 102. In one embodiment, the deployment templates generated using the template generator 105 may be added directly to enterprise catalog service platform 108 by the generator 105 or may (if subsequently published) be discovered and ingested by the enterprise catalog service through product discovery service 110. After being generated and added to the enterprise catalog service platform 108, the deployment templates produced by the template generator 105 may be treated in substantially the same manner as the templates produced using the template editor 104.

Figure 6:
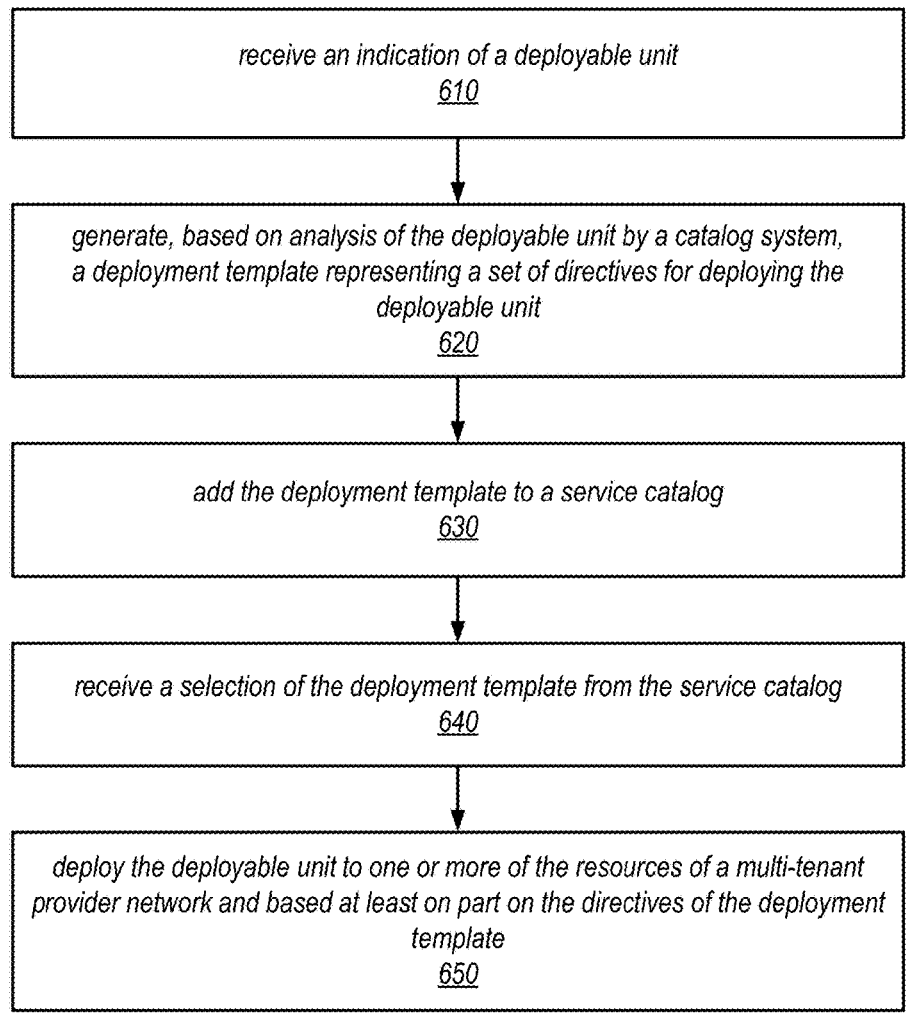
FIG. 6 is a flow diagram illustrating one embodiment of a method for generating deployment templates for deployable units.

FIG. 6 is a flow diagram illustrating one embodiment of a method for generating deployment templates for deployable units. One or more of the operations shown in FIG. 6 may be performed or implemented by the catalog system 100 and/or provider network 200. As shown in 610, an indication of a deployable unit may be received. The indication may represent a name or other identifier of the deployable unit and/or a link to the deployable unit. The deployable unit may comprise program instructions, e.g., as associated with one or more machine images, software products, software installers, or batch files. The indication of the deployable unit may be received by the catalog system from an administrator.

As shown in 620, a deployment template may be generated for the deployable unit. The deployment template may represent one or more directives for deploying the deployable unit. The deployment template may be generated based (at least in part) on analysis of the deployable unit by the catalog system. For example, the deployable unit may be inspected to determine its type. The type of the deployable unit may dictate further inspection or analysis of the deployable unit based on its particular type and/or solicitation of user input for the particular type to determine metadata for use in generating the deployment template.

As shown in 630, the deployment template may be added to a service catalog. The service catalog may include entries for a plurality of additional deployment templates, and the various deployment templates may be discoverable by administrators and other users in the catalog. As shown in 640, a selection of the deployment template from the service catalog may be received. The selection may be received by the catalog system from an administrator or user through any suitable interface.

As shown in 650, the deployable unit described in the selected deployment template may be deployed to one or more resources of a multi-tenant provider network. Deploying the deployable unit may include reserving and provisioning any of the resources (including computing resources, storage resources, database resources, network resources, and another suitable resources), configuring any of the resources for deployment, and/or installing and configuring one or more software products represented by the deployable unit. The deployable unit may be deployed based (at least on part) on the directives, constraints, and other metadata of the deployment template. Therefore, the resources used for deployment may represent only instance types, resource types, and/or regions that are indicated as being allowed in the deployment template. Deployment may include obtaining any inputs specified in the deployment template, returning any outputs specified in the deployment template, ensuring that any dependencies are met as specified in the deployment template, and/or selecting one or more parameters as specified in the deployment template. Deployment may also be performed in accordance with any constraints that exist outside of the deployment template, such as constraints 136 as illustrated in FIG. 1.

Figure 7:
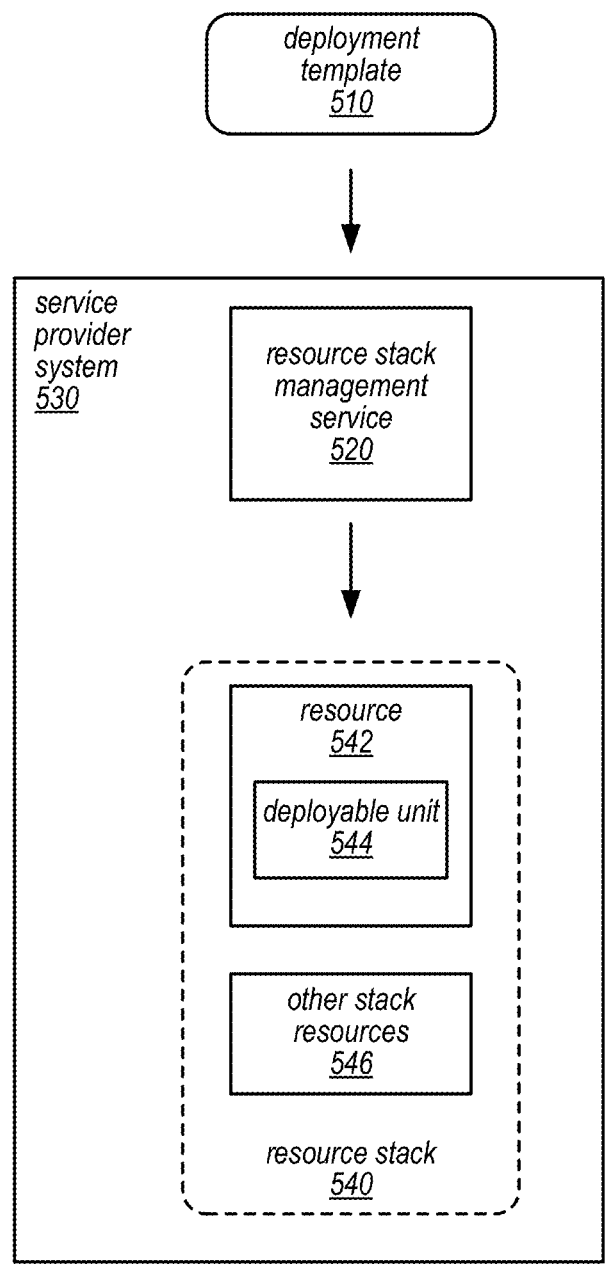
FIG. 7 illustrates the use of a deployment template to build and deploy a product, according to at least some embodiments.

FIG. 7 illustrates the use of a deployment template to deploy a deployment unit, according to at least some embodiments. As illustrated in this example, a client of a service provider system 530 may select or otherwise provide a deployment template 510 that represents directives, constraints, and/or other metadata for deploying a deployable unit 544 such as a software product. In some embodiments, the deployment template 510 may be received from an IT administrator of a service provider customer (e.g., through a service provider management console such as service provider management console 106 illustrated in FIG. 1) or from an end user (e.g., through a resource stack management service console such as resource stack management service console 130. In some embodiments, the deployment template 510 may be generated by the catalog system 100 based on the submission of a deployable unit 544.

In some embodiments, in response to receiving the deployment template 510, the service provider system 530 (or, more specifically, a resource stack management service 520 that is implemented on the service provider network) may parse the template and build the stack of resources 514 that are defined in the template 510 and that will be used to execute or otherwise implement the deployable unit 544 (shown as resource stack 540). For example, in some embodiments, the resource stack management service 520 may include a resource provisioning system that is configured to instantiate the resources defined in the template 510 to create resource stack 540. In some embodiments, building the resource stack 540 may include instantiating at least one computing resource instance (e.g., resource 542) that will execute or otherwise implement the deployable unit 544 and manage its runtime environment, and may include one or more other stack resources (shown as stack resources 546). The resource 542 may be a virtualized computing resource instance that has a predefined computing capacity and/or memory capacity. In some embodiments, the resource 542 may be loaded with an operating system, configuration files, or other resources that are pre-installed on the resource 542 when it is instantiated. In some embodiments, the computing resource instance may include an initialization script that will be used to apply the metadata defined in the deployment template 510 to the resource 542 and/or deployable unit 544 when the application is launched on resource stack 540 by an end user (e.g., through its selection within a GUI of a resource stack management service console such as resource stack management service console 130 illustrated in FIG. 1). Note that, in some embodiments, service provider system 530 may also include other services that interact with the resource stack (e.g., an identity management service or other security/authorization services).

Administrator Tasks

As previously noted and described in more detail below, in order to manage the delivery of software products to end users, an IT administrator of a business, enterprise, or other organization may be able to perform a variety of different actions through an administrator console of an application fulfillment platform (such as service provider management console 106 in FIG. 1 or service provider system console 422 in FIG. 4), many of which fall into one of the following three broad categories:

1) Building a catalog for the organization, where the catalog is a collection of software products that may include any of the following product types:
    the organization's own line-of-business (e.g., custom) applications
    desktop applications or server products for which the organization has purchased licenses, including enterprise-wide licenses (e.g., products that may be included in the catalog under a "bring your own license" model)
    desktop applications or server products purchased or leased from the service provider (e.g., products that were developed by the service provider or that were purchased or leased by the service provider for the benefit of its customers)
2) Assigning particular software products to specific end users and/or user groups in the same organization
3) Generating, obtaining, and/or viewing reports indicating the usage of the software products that are provided through an application fulfillment platform or resource stack management service to end users in the same organization As noted above, the systems and methods described herein for implementing an application fulfillment platform may, in various embodiments, allow large enterprises to create and manage catalogs (or portfolios) of software applications and computation services, including server applications that execute in a cloud computing environment and desktop applications that execute on physical computing devices, virtualized computing resource instances, and virtual desktop instances. These systems may allow service provider customers (e.g., enterprises) to ingest their own line-of-business applications (e.g., server applications and/or desktop applications) into the catalogs (or portfolios), through which they may be made available for use by their end users. In some embodiments, an IT administrator of a service provider customer may interact with the service provider system through an administrator console to assign and provision applications to various end users and/or to define constraints on the use of those applications. This may include invoking operations or workflows of a resource stack management service (in the case of server applications) or an application fulfillment platform (in the case of desktop applications to be executed on an end user's physical computing device or virtual desktop instance).

In some embodiments, a company that wishes to use one or more applications for software trials, short-term needs or low-volume needs may obtain access to those applications through an "applications on-demand" model that is managed through the application fulfillment platform (thus, taking advantage of the more favorable terms that may be received by the service provider as a higher volume customer of the application vendor). In some embodiments, the company may obtain access to server products under a similar "services on-demand" model that is managed through the resource stack management service.

As noted above, in some embodiments, desktop applications (e.g., individual applications and/or collections of applications) and/or products (e.g., server products) may be assigned by an IT administrator to individual users and/or user groups in an active directory to allow access to those applications. For example, an active directory of an enterprise (e.g., a company that is a customer of a service provider) may sit at the center of its resource management processes. Resources (e.g., users, computers, printers, or other corporate resources, each of which may have its own identifier) may be connected to the active directory, and an IT administrator at the company may give users access to particular ones of the resources. In some embodiments, an IT administrator may create a cloud-based active directory for the enterprise. In other embodiments, connections may be made from a virtual desktop instance to an active directory on an enterprise computer system.

In some embodiments, the IT administrator may, through an administrator console (e.g., a service provider system console) assign particular desktop applications and/or products (e.g., server products) to specified users (and/or user groups) by selecting one or more users and/or user groups in its active directory from a display of the active directory (or through another interface into the active directory). For example, the IT administrator may be able to assign applications (e.g., one or more desktop applications, such as an office productivity suite, a data analysis application and/or a browser application) or server products (such as a website design package or blog publishing package) to the selected users and/or user groups (e.g., groups of users that are defined in the active directory, such as a "development team" or "legal team"). In another example, an IT administrator may wish to provision a desktop application (e.g., a word processing application) to user1, user2, and group1 in an active directory. The actions taken in order to carry out that fulfillment may depend on the type of application. In this example, since the application is a desktop application that is available through an application fulfillment platform, the IT administrator may (e.g., through an administrator console) assign the desktop application to user1, user2, and group1, and fulfilling the intended state for user1, user2, and group1 may include invoking various workflows of the application fulfillment platform. In another example, if a server product (e.g., a server-side application that executes on a pre-defined stack of a service provider resources on behalf of an end user and returns a response) is to be provisioned to user1, user2 and group1, fulfilling the server product may include invoking workflow of the resource stack management service.

In some embodiments, the IT administrator may, through an administrator console (e.g., a service provider system console) also be able to apply various constraints on the use of selected desktop applications and/or products (e.g., server products) by end users or user groups to which these products are assigned (either individually, or collectively). For example, in various embodiments, the constraints that may be applied by the IT administrator may be broadly categorized as being one of the following four types: environmental constraints (which may restrict the region in which a product can be provisioned), input parameter constraints (which may restrict the set of valid values for input parameters that can be entered when a software product is provisioned or updated), quotas (which may allow the administrator to control the number of concurrent deployments of a given software product) and billing constraints (which may allow the administrator to control spending limits on an product by product basis). In some embodiments, constraints may applied at multiple levels (e.g., per product per user or user group, per product catalog or portfolio, or at one level for some catalogs/portfolios or users and at another level for other catalogs/portfolios or users. For example, when constraints are applied to a catalog or portfolio, all users who have access to that portfolio will have same constraints and permissions on the products in the catalog or portfolio by default, but there may also be some specific constraints for particular product/user combinations. For example, one user may have to select a radio button element of a GUI presented by an end user console in order to install a particular product. For other users, the product may automatically appears on their system under an "autodeploy" setting selected for the user. In this example, required software products may be automatically installed by default, while optional products may be "user initiated". In another example, a product level constraint may specify that no one customer or user can install more than 10 copies of a particular product (e.g., because of the number of licenses the organization has purchased).

In yet another example, the collection of three applications described above may be assigned to three active directory users, one of which may represent a user group. In this example, constraints may be set indicating that user1 should use a particular version of application1 (e.g., an office productivity suite) and should not have access to any updated versions of application1; that user2 should use a particular version of application2 (e.g., a data analysis application) that is compatible with a particular operating system revision and should not have access to any updated versions of application2; and that user3 (which may represent a group of active directory users) may have access to application3 (e.g., a browser application) that should always be kept current (e.g., with updates applied automatically, when available).

As previously noted, an administrator may define rules that limit the parameter values that a user can enter when they use a product. These rules define input parameter constraints. Other constraints may be attached to a catalog or portfolio of software products, and may apply to all products in the catalog/portfolio or to individual products within the catalog/portfolio. In some embodiments, constraints may be associated with IAM users, groups or roles allowing an IT administrator to restrict the service provider resources that can be created by specific end users or groups of users. The constraints that are enforced when provisioning a product or updating a product that is being used may be evaluated by combining all of the constraints from the catalog/portfolio or product, and the intersection of all the constraints may be enforced when the user is provisioning the product. In some embodiments, the most restrictive set of constraints may be applied when different sets of constraints have been selected for a given user or software product. For example, if a product may allow all computing resource instances to be launched, and a catalog or portfolio that contains the software product may have a constraint that allows all non-GPU computing resource instances to be used, but the user has a constraint that only allows tiny and extra small computing resource instances to be launched, then the effective constraint used when that user provisions that product from that portfolio will be the constraint that only allows tiny and extra small computing resource instances to be launched.

As noted above, in some embodiments, the IT administrator may, through an administrator console (e.g., a service provider system console) be able to generate, obtain, and/or view reports indicating the usage of the desktop applications and/or products (e.g., server products) that are provided through the service to their end users. For example, these reports may indicate how many (and/or which) users are using each software product, how many (and/or which) users are using each version (e.g., the latest version or an outdated version) of a particular software product, the duration for which each software product is used by one or more users, and/or other usage information. The information in these reports may be used by the IT administrator to determine which of several available licensing models (e.g., on-demand subscriptions/leases using licenses obtained by the service provider, enterprise licenses obtained directly from the software vendors but managed by the service provider, etc.) may be most suitable for the software being used by their organization.

As previously noted, the enterprise catalog service platforms described herein may be used to manage server products on behalf of customers and their end users instead of, or in addition to, managing desktop applications. One embodiment of a method for managing server products (e.g., server-type applications that execute on a service provider system on behalf of an end user and return a response) through an enterprise catalog service (such a service implemented by the system illustrated in FIG. 1) is illustrated by the flow diagram in FIG. 8. As illustrated at 810, in this example, the method may include an IT administrator of a service provider customer organization selecting, from a product discovery service, one or more resource stack templates that are sourced by third parties, and ingesting the resource stack templates into a product catalog owned by the IT administrator for subsequent deployment to end users in the customer organization. The method may also include ingesting one or more line-of business resource stack templates (e.g., custom resource stack templates that were developed by the customer organization) into the IT administrator's product catalog, as in 820.

As illustrated in this example, the method may include receiving (e.g., from an IT administrator of a service provider customer), through a service provider management console, input indicating the selection of one or more previously ingested resource stack templates to be included in a portfolio for subsequent access by end users (as in 830). For example, in various embodiments, the resource stack templates may be selected for inclusion in a private catalog or portfolio that may only be accessible to a subset of the end users of the service provider customer. In one example, the input may be received from an IT administrator of a business, enterprise, or other organization that receives services through the enterprise catalog service platform and/or from a resource stack management service (i.e., an organization that is a service provider customer). In this example, the IT administrator may log into the system provider management console in order to create and/or manage one or more portfolios of server products (each of which may be constructed using a respective resource stack template) for the use of some or all of the members of their organization. In various embodiments, the selection of resource stack templates may be made by the IT administrator, and may be dependent on technical features (e.g., capabilities of the server product and/or resources required to create the corresponding resource stack), a pricing breakdown, the applicable terms of use (e.g., licensing or subscription terms), ratings and/or reviews, the availability of support from the vendor and/or other information, including organizational needs, goals, or policies.

As illustrated in this example, the method may include receiving (e.g., from an IT administrator of a service provider customer), through a service provider management console, input indicating the assignment of selected resource stack template(s) to one or more end users and/or user groups, constraints on use of the selected template(s) and/or configuration parameter setting(s) for the portfolio (as in 840). For example, in some embodiments, constraints and/or configuration parameter settings may be specified as part of an operation to assign server products to particular users or user groups. In other embodiments, constraints and/or configuration parameters may be specified as part of a separate interaction between the IT administrator and the console (e.g., as part of a portfolio configuration operation), and information indicating the constraints and/or configuration parameter settings may be received as separate inputs through the service provider management console. In some embodiments, the constraints may indicate which (if any) of the server products in the portfolio are required to be installed by end users and which (if any) are optional. In some embodiments, the configuration parameter settings may indicate whether monitoring should be enabled for the portfolio (and/or particular server products in the portfolio) or may indicate whether end users have the option to view lists of server products that are not assigned to them and/or that are not currently available in the portfolio (e.g., third party products that have not yet been ingested into the enterprise catalog service platform).

As illustrated in this example, the method may also include storing information representing the assignment of the selected resource stack templates to particular end users and/or user groups, the constraints, and configuration parameter settings for the selected resource stack templates, users, and portfolio, as in 850. For example, this information may be stored in any of a variety of data structures or database tables by a storage service implemented on the service provider network. The method may also include making the selected resource stack templates available to the end user(s) through a resource stack management service console, according to the constraints and configuration parameter settings for the selected resource stack templates and users, as in 860. In some cases, this may include installing any required server products and/or making certain server products (e.g., those server products that are assigned to a particular end user or those an end user is allowed to know about) visible and/or selectable through a resource stack management service console (e.g., through icons, shortcuts, menu elements, or other user interface mechanisms or elements thereof that were created on the resource stack management service console for the server products and whose selection launches the server products).

Figure 8:
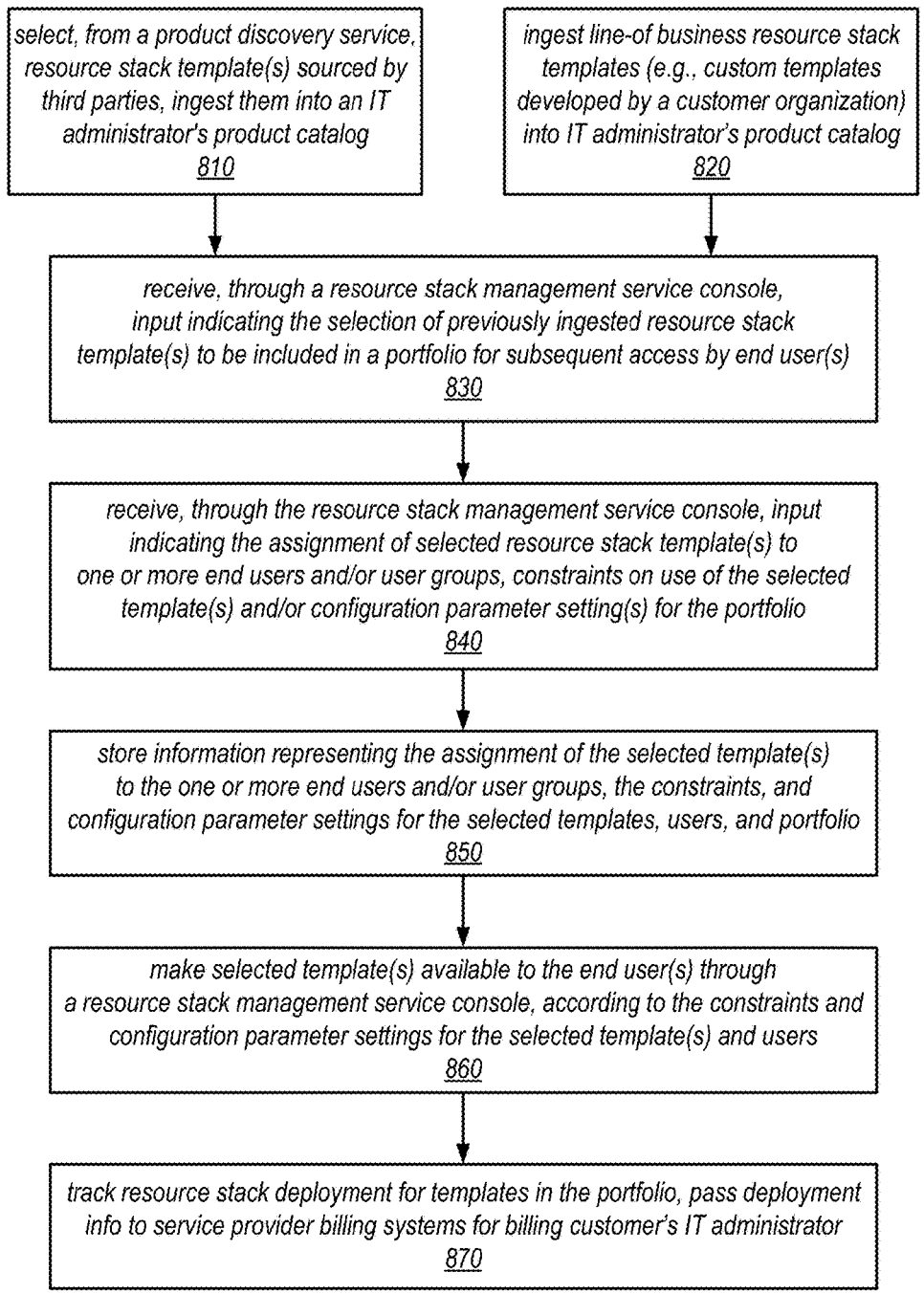
FIG. 8 is a flow diagram illustrating one embodiment of a method for managing software products through an enterprise catalog service.

As illustrated in FIG. 8, in some embodiments, the method may also include tracking the deployment of resource stack templates that are included in the portfolio and passing deployment information to a service provider billing system for subsequent use in billing the service provider customer's IT administrator for the use of those resource stack templates (as in 870). For example, the method may include generating reports indicating the number of resource stacks that are launched for each resource stack template in the portfolio automatically (e.g., periodically or in response to changes in the catalog/portfolio or resource stack template usage) or upon request. In some embodiments, the reports may be delivered through the service provider management console or resource stack management service console (e.g., to IT administrators and/or end users) in addition to being passed to a service provider billing system. In various embodiments, the reports may indicate how many (and/or which) users have deployed a resource stack for each resource stack template, the duration for which each resource stack instance is used by an end user, and/or other deployment/usage information.

Figure 9:
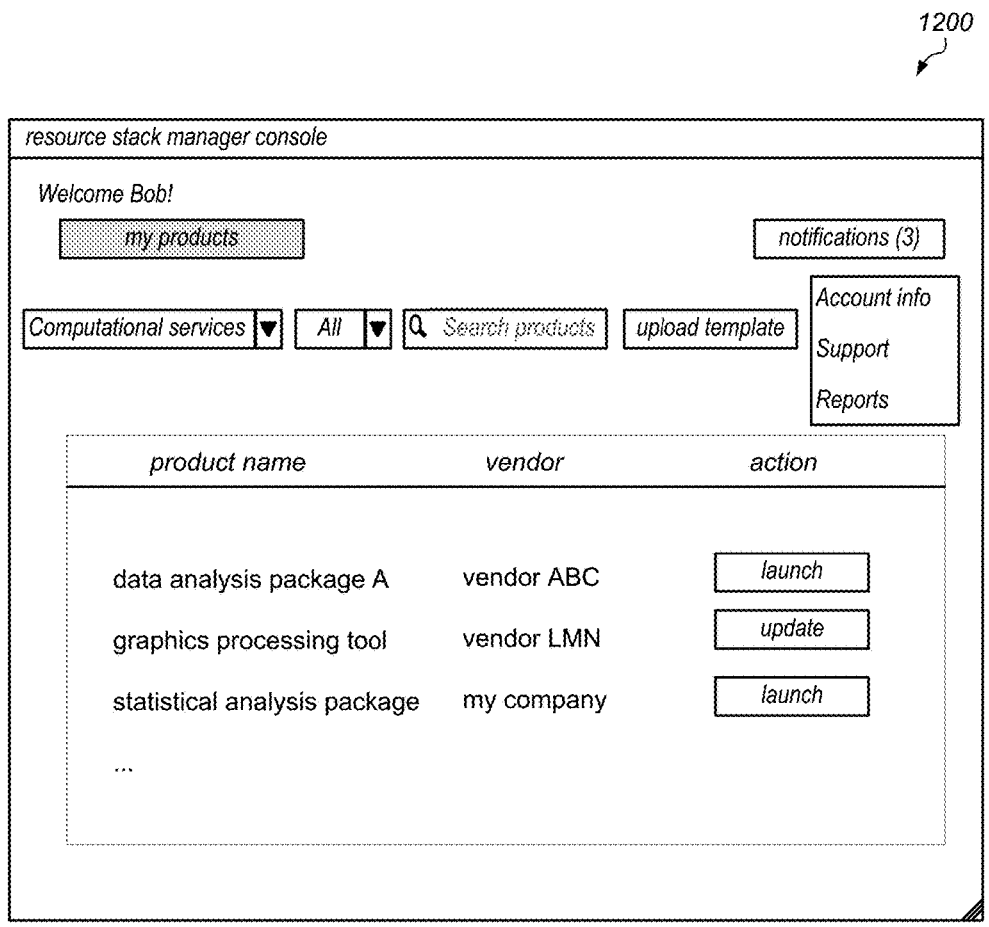
FIG. 9 illustrates an example of the information presented to an end user through a graphical user interface of a resource stack management service console, according to at least some embodiments.

FIG. 9 illustrates an example of the information presented to an end user through a graphical user interface (GUI 1200) of a resource stack management service console, according to at least some embodiments. In this example, the information may be presented to an end user who wishes to search for, select, and launch a service (e.g., a server product) that is managed by an enterprise catalog service (e.g., in response to selection of the "my products" tab near the top of the display). More specifically, the end user has chosen to filter their search results by choosing "Computational services" from among multiple product type options. In this example, GUI 1200 also presents options for the end user to upload a resource stack template ("upload template"), to generate and/or view reports (e.g., server product deployment reports), and to view (and, in some cases, take action in response to) notifications. Note that in some embodiments, the end user may also be presented with an option to create a resource stack template, while in other embodiments, only an IT administrator or other privileged user may be allowed to create a resource stack template (e.g., through a management interface of the enterprise catalog service).

The information presented in this example includes, in one portion of the display, a list of server products (e.g., server-type applications that execute on a service provider system on behalf of an end user and return a response), each of which may be constructed using a respective resource stack template, along with the vendors that developed or published the server products (or corresponding resource stack templates) and/or from which they were obtained, and user interface elements that may be selected if the end user would like to launch or update a particular one of the listed server products. More specifically, this portion of the display presents a list of computational services for selection by the end user, including a data analysis package A from vendor ABC, a graphics processing tool from vender LMN, and a statistical analysis package that was developed by the end user's organization (e.g., a customer-specific line-of-business service) and was previously uploaded to, and ingested by, the enterprise catalog service. In this example, if the end user were to select an option to launch one of these server products, this may initiate a workflow to provision and deploy a resource stack for the selected service, according to a resource stack template for the selected service (e.g., one that is stored in a private catalog or portfolio to which the end user has access).

Figure 10:
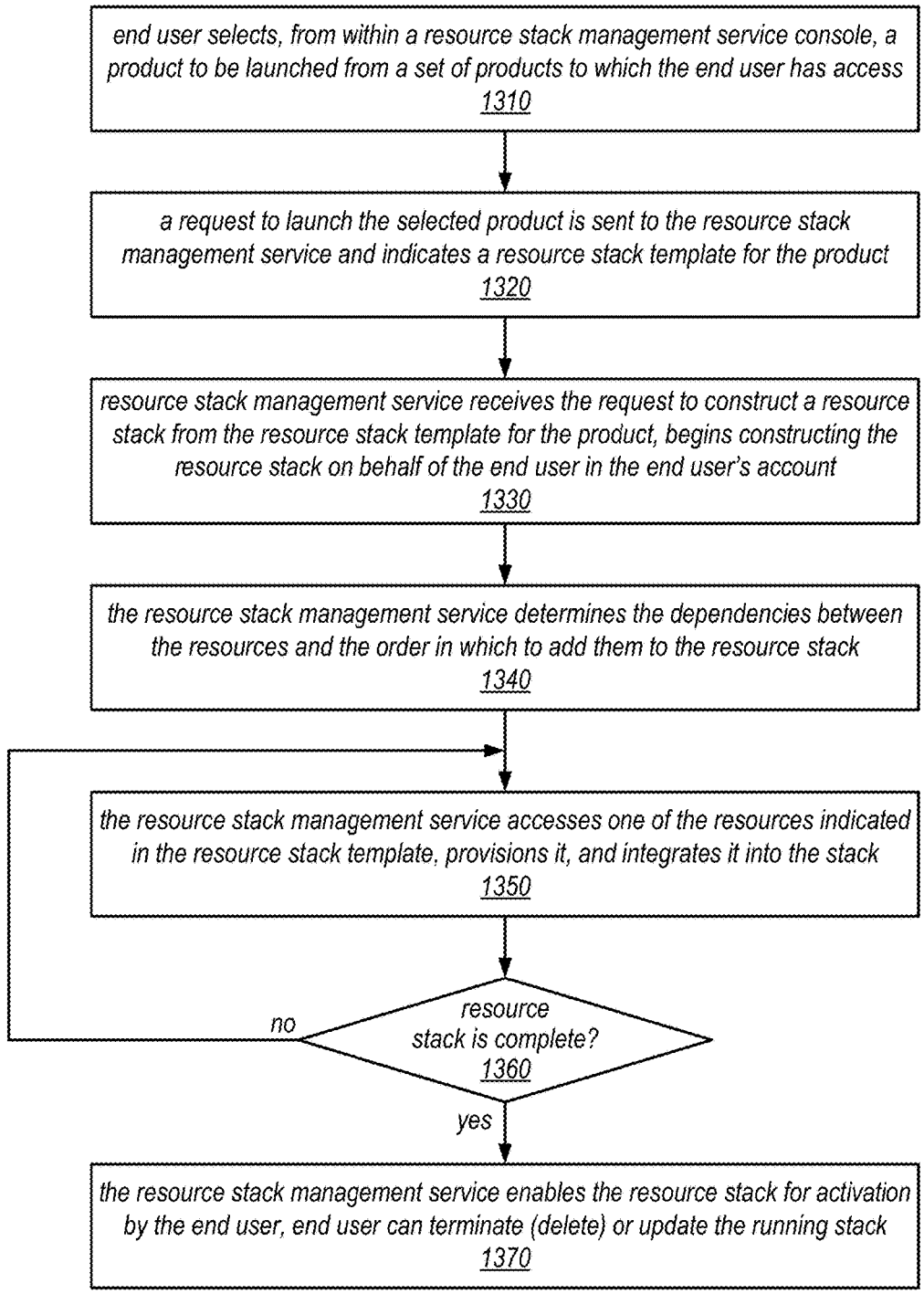
FIG. 10 is a flow diagram illustrating one embodiment of a method for requesting and launching a product that is managed through an enterprise catalog service implemented by a service provider.

One embodiment of a method for requesting and launching a product that is managed through an enterprise catalog service implemented by a service provider is illustrated by the flow diagram in FIG. 10. As illustrated at 1310, in this example, the method may include an end user selecting, from within a resource stack management service console, a product to be launched from a set of products to which the end user has access (e.g., a private catalog or portfolio of server products). In response to the selection, the method may include sending (e.g., by the resource stack management service console to the resource stack management service) a request to launch the selected product, which indicates a resource stack template for the product (as in 1320). The method may include the resource stack management service receiving the request to construct a resource stack from the resource stack template for the product, and beginning construction of a resource stack on behalf of the end user in the end user's account (e.g., based on metadata in the template and according to the end user's permissions), as in 1330. Note that, in this example, the resources of the resource stack are provided by the service provider (e.g., they are implemented on service provider resources).

As illustrated in FIG. 10, the method may include the resource stack management service determining the dependencies between the resources defined in the resource stack template and/or the order in which the defined resources should be added to the resource stack (as in 1340). For example, the resource stack template being used to construct the resource stack may define links between the resources that will be subsequently used in configuring resources of a resource stack to communicate with one another over a network, transmit requests, receive responses and otherwise interoperate. In other words, the template may define connections of the resource stack, such as a network topology for use with the resource stack that defines connectivity and/or communication paths available to resources within the resource stack.

As illustrated in this example, the method may include the resource stack management service accessing one of the resources indicated in the resource stack template, provisioning it, and integrating it into the resource stack that is under construction (e.g., in accordance with the determined order, specified dependencies, or other application constraints or configuration parameter values), as in 1350. Until and unless the resource stack is complete, the method may include repeating the operations illustrated at 1350 for each of the resources indicated in the resource stack template. This is illustrated in FIG. 10 by the feedback from the negative exit of 1360 to 1350. Once the resource stack is complete (shown as the positive exit from 1360), the method may include the resource stack management service enabling the resource stack for activation by the end user, after which the end user can terminate (delete) or update the running resource stack, as desired (as in 1370).

As previously noted, products selected from the enterprise catalog service and launched on behalf of end users may be provisioned and/or executed under the end user's account, roles, and permissions or using the account, roles, and permissions of another user (e.g., the IT administrator or another user with higher permission levels than the end user). In various embodiments of the enterprise catalog service, some or all of the following use cases may be supported:

1. An end user selects and launches a product from a catalog or portfolio and the resource stack (and resources) are created in the end user's account. In this case, all operations of the resource stack management service, as well as operations of underlying services within resource stack management service and/or the enterprise catalog service, are performed as the end user (using forward access sessions).
2. An end user selects and launches a product from the catalog or portfolio that has an identity and access management (IAM) role associated with it. In this case, all operations of the resource stack management service, as well as operations of underlying services within resource stack management service and/or the enterprise catalog service, are performed using the IAM role specified by the product (e.g., by assuming that IAM role). This may enable administrators to define products that contain an array of service provider resources without the end user having IAM permissions to the underlying services. In this case, the end user may only need access to the enterprise catalog service APIs.
3. As an extension of use case 2 above, the role associated with a product may be in a different account from the end-user. This may allow for "managed service" scenarios in which the end user controls the (create, update, delete) life cycle of the resource stack, but does not have access to, or even need to know about, the resources that are being used to implement the resource stack.

In the latter two cases, the service catalog runtime may act as a trusted entity allowing administrators to define IAM policies for the roles that only allow the service catalog runtime to assume them. This may allow administrators to lock down end user accounts so that they may only launch and manage services through the service catalog. In some embodiments, the catalog service may store metadata about the product (name, description, etc.), and the service catalog runtime may be responsible for defining and storing additional information about a product. For example, the service catalog runtime may be responsible for defining the raw resource stack template that defines the resources that must be created for the product (which may include any resource supported by the resource stack management service other than IAM resources), resource stack constraints, a parameter grouping document, and/or an IAM role that the service catalog runtime will assume when the product is acted upon. Note that, although constraints live inside the template, constraints may also be added at several levels within the service catalog, and the constraints documents may be joined together as part of processing the inputs when a stack is launched or updated. Among other things, the constraints may define what values a user may pass into the parameters during construction. The parameter grouping document may define the ordering/grouping of parameters for the console when rendering them to the end user. This feature may allow the creator of the product to have some control over how these options are presented in the console when a user is creating a resource stack.

In various embodiments, the resource stack management service may expose any or all of the following APIs:
LaunchStack—This API creates a resource stack for the provided product.
TerminateStack—This API deletes a specified resource stack and all resources associated with it.
DescribeStack—This API provides detailed information about a resource stack (e.g., input parameters, outputs, etc.).
ListStackEvents—This API provides a list of events for a resource stack (e.g., resource creation, updates, etc.). In some embodiments, this list may be filtered for certain users (e.g., they may not be able to see the service provider resources).
ListStacks—This API lists all of the resource stacks for the account, along with basic information about them.
UpdateStack—This API updates a product to a new version of the product.
UpdateStackConfiguration—This API allows updates to the input parameters of a stack, giving IT administrators more control over what their end users can do.

Figure 11:
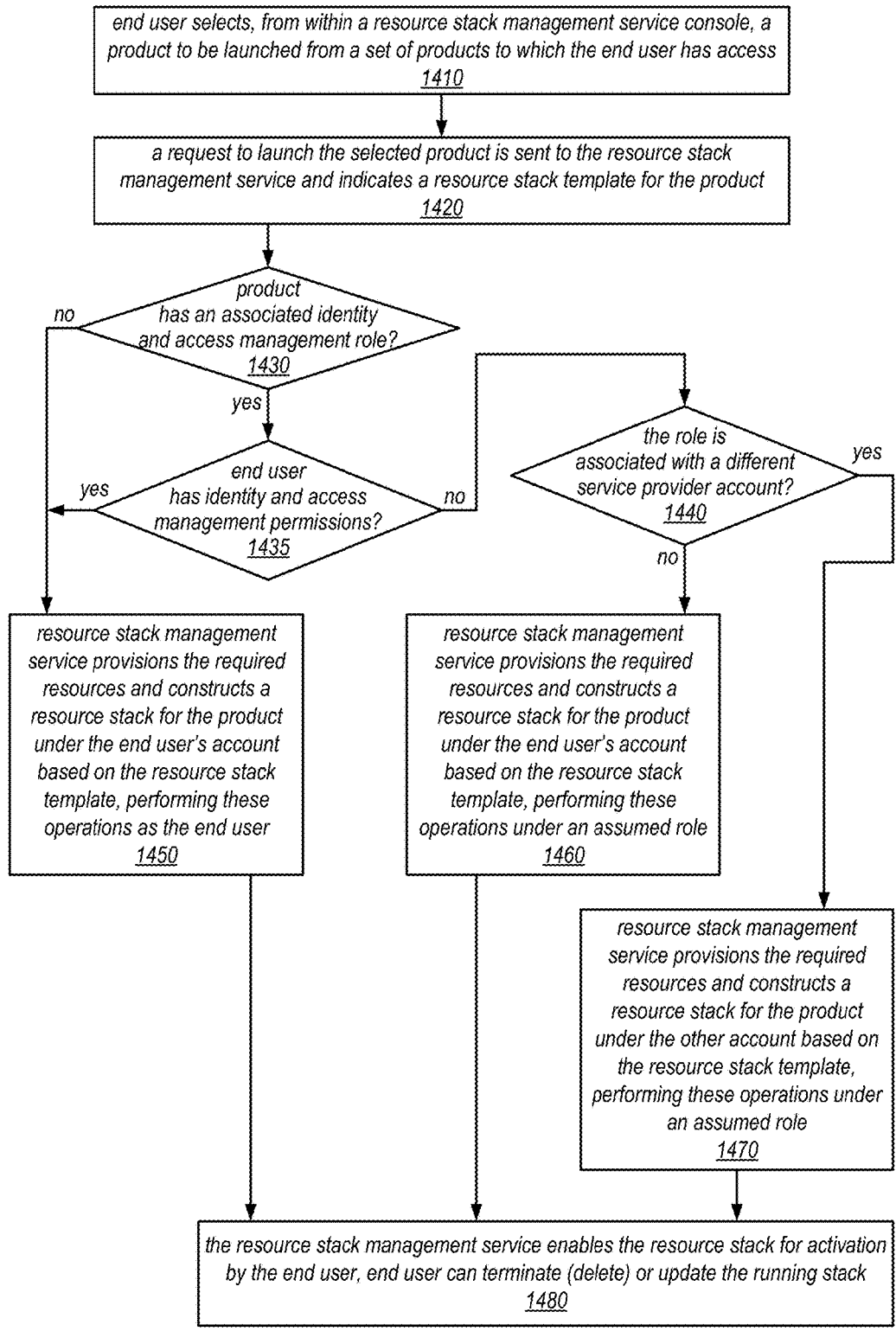
FIG. 11 is a flow diagram illustrating one embodiment of a method for launching a product through an enterprise catalog service that supports identity and access management role.

One embodiment of a method for launching a product through an enterprise catalog service that supports identity and access management roles is illustrated by the flow diagram in FIG. 11. As illustrated at 1410, in this example, the method may include an end user selecting, from within a resource stack management service console, a product to be launched from a set of products to which the end user has access (e.g., a private catalog or portfolio of server products). The method may include sending (e.g., from the resource stack management service console to the resource stack management service) a request to launch the selected product, where the request indicates a resource stack template for the product, as in 1420. In other words, the underlying resources that will be used to implement the server product (e.g., a service) may be defined in a resource stack template that is specified in the request.

As illustrated in this example, if the selected product has an associated identity and access management role (shown as the positive exit from 1430) and the end user has the appropriate identity and access management permissions (e.g., permission to access the underlying resources defined in the resource stack template, shown as the positive exit from 1435, the method may include the resource stack management service provisioning the required resources and constructing a resource stack for the product under the end user's account based on the resource stack template, where the resource stack management service performs these operations as the end user (as in 1450). Similarly, if the selected product does not have an associated identity and access management role (shown as the negative exit from 1430), the method may include the resource stack management service provisioning the required resources and constructing a resource stack for the product under the end user's account based on the resource stack template, where the resource stack management service performs these operations as the end user (as in 1450).

If the selected product has an associated identity and access management role (shown as the positive exit from 1430), but the end user does not have the appropriate identity and access management permissions (e.g., permission to access the underlying resources), shown as the negative exit from 1435, the method used to launch the selected product may be dependent on whether or not the role is associated with a different service provider account (i.e., an account that is different from the end user's service provider account), as in 1440. For example, if the role is associated with a different service provider account (shown as the positive exit from 1440), the method may include the resource stack management service provisioning the required resources and constructing a resource stack for the product under the other account based on the resource stack template, where the resource stack management service performs these operations under an assumed role, as in 1470. However, if the role is not associated with a different service provider account (shown as the negative exit from 1440), the method may include the resource stack management service provisioning the required resources and constructing a resource stack for the product under the end user's account based on the resource stack template, where the resource stack management service performs these operations under an assumed role, as in 1460.

As illustrated in this example, in some embodiments, once the resource stack has been provisioned (as shown in elements 1450, 1460, or 1470 in FIG. 11), the method may include the resource stack management service enabling the resource stack for activation by the end user, after which the end user can terminate (delete) or update the running stack as desired (as in 1480). In other words, in some embodiments, even if an end user does not have the specified identity and access management role for a particular server product, the end user may be able to use the product and control the lifetime of the constructed stack. However, in this case, the end user might not be able to directly access the underlying resources of the constructed stack.

Illustrative System

In at least some embodiments, a server that implements some or all of the techniques for managing and deploying desktop applications and services through an enterprise catalog service as described herein may include a computer system that includes or is configured to access a non-transitory computer-accessible (e.g., computer-readable) media, such as computer system 1500 illustrated in FIG. 12. For example, in various embodiments, any or all of the computer system components described herein (including, e.g., data center computers and/or other components on a service provider network that collectively provide virtual computing services and/or virtual storage services, virtualized computing resource instances, virtual machines, virtual machine monitors or hypervisors, and/or virtual desktop instances; or client computing devices or other components on a client network) may be implemented using a computer system similar to computer system 1500 that has been configured to provide the functionality of those components. In the illustrated embodiment, computer system 1500 includes one or more processors 1510 coupled to a system memory 1520 via an input/output (I/O) interface 1530. Computer system 1500 further includes one or more network interfaces 1540 coupled to I/O interface 1530. In some embodiments, network interfaces 1540 may include two or more network interfaces (including, e.g., one configured for communication between a virtualized computing resource hosted on the computer system 1500 and its clients, and one configured for communication between a virtualized computing resource and external resources, computing systems, data centers, or Internet destinations on networks other than the provider network and a client network on whose behalf the virtualized computing resources are hosted. In other embodiments, network interface(s) 1540 may be a single network interface.

In various embodiments, computer system 1500 may be a uniprocessor system including one processor 1510, or a multiprocessor system including several processors 1510 (e.g., two, four, eight, or another suitable number). Processors 1510 may be any suitable processors capable of executing instructions. For example, in various embodiments, processors 1510 may be processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

System memory 1520 may be configured to store instructions and data accessible by processor(s) 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for managing and deploying desktop applications and services through an enterprise catalog service, are shown stored within system memory 1520 as code 1525 and data 1526. For example, data 1526 may include information representing software products, virtualized application packages, resource stack templates, the assignment of selected software products to particular end users and/or user groups, constraints and/or configuration parameter settings for the selected software products, users, and catalogs or portfolios, usage data, billing information, various types of metadata that is maintained for particular software products, and/or any other information usable in managing and deploying desktop applications and services, any of which may be stored in any of a variety of data structures or database tables within memory 1520 on one or more computing nodes of a service provider system and/or client computing device used in managing and deploying desktop applications and services through an enterprise catalog service, as described herein.

In one embodiment, I/O interface 1530 may be configured to coordinate I/O traffic between processor 1510, system memory 1520, and any peripheral devices in the device, including any of network interface(s) 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface(s) 1540 may be configured to allow data to be exchanged between computer system 1500 and other devices 1560 attached to a network or networks 1550, such as other computer systems or devices as illustrated in the figures, for example. In various embodiments, network interface(s) 1540 may support communication via any suitable wired or wireless general data networks, such as types of Ethernet network, for example. Additionally, network interface(s) 1540 may support communication via telecommunications/telephony networks such as analog voice networks or digital fiber communications networks, via storage area networks such as Fibre Channel SANs, or via any other suitable type of network and/or protocol.

In some embodiments, system memory 1520 may be one embodiment of a computer-accessible medium configured to store program instructions and data as described above for implementing various embodiments of the techniques for managing and deploying desktop applications and services through an enterprise catalog service described herein. However, in other embodiments, program instructions and/or data may be received, sent or stored upon different types of computer-accessible media. Generally speaking, a computer-accessible (e.g., computer-readable) medium may include non-transitory storage media or memory media such as magnetic or optical media, e.g., disk or DVD/CD coupled to computer system 1500 via I/O interface 1530. A non-transitory computer-accessible (e.g., computer-readable) storage medium may also include any volatile or non-volatile media such as RAM (e.g. SDRAM, DDR SDRAM, RDRAM, SRAM, etc.), ROM, etc, that may be included in some embodiments of computer system 1500 as system memory 1520 or another type of memory. Further, a computer-accessible medium may include transmission media or signals such as electrical, electromagnetic, or digital signals, conveyed via a communication medium such as a network and/or a wireless link, such as may be implemented via network interface(s) 1540.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computing devices configured to implement a catalog system and a plurality of resources of a multi-tenant provider network wherein the catalog system is configured to:
receive an indication of a deployable unit, wherein the deployable unit represents a software product;

analyze the deployable unit to determine that the deployable unit is of a particular type;

generate, based at least in part on the particular type of the deployable unit determined from said analyze, a deployment template representing a set of directives for deploying the deployable unit, wherein the deployment template comprises a description of the deployable unit and a description of a subset of the plurality of resources associated with the deployable unit;

add the deployment template to a service catalog, wherein the service catalog comprises entries for a plurality of additional deployment templates;

receive a selection of the deployment template from the service catalog; and in response to the selection, deploy the deployable unit to one or more of the resources of the multi-tenant provider network, wherein the deployable unit is deployed based at least on part on the directives of the deployment template.

2. The system as recited in claim 1, wherein the catalog system is configured to:

solicit input representing metadata for deploying the deployable unit, wherein the input is solicited using a user interface for the particular type.

3. The system as recited in claim 1, wherein the analysis of the deployable unit determines metadata for deploying the deployable unit using inspection of the deployable unit based at least in part on the particular type.

4. A computer-implemented method, comprising:

performing, by a catalog system implemented on one or more computing devices:

receiving an indication of a deployable unit;

analyzing the deployable unit to determine a particular type of the deployable unit;

generating, based at least in part on the particular type of the deployable unit determined from said analyzing, a deployment template representing one or more instructions for deploying the deployable unit; and deploying the deployable unit to one or more resources of a multi-tenant provider network, wherein the deployable unit is deployed based at least on part on the instructions of the deployment template.

5. The method as recited in claim 4, further comprising:

adding the deployment template to a service catalog, wherein the service catalog comprises entries for a plurality of additional deployment templates; and receiving a selection of the deployment template from the service catalog, wherein the deployable unit is deployed based at least in part on the selection.

6. The method as recited in claim 4, wherein the deployment template comprises a description of the deployable unit and a description of resources of the multi-tenant provider network that are associated with the deployable unit.

7. The method as recited in claim 4, wherein the method further comprises:

soliciting input representing metadata for deploying the deployable unit, wherein the input is solicited using a user interface for the particular type.

8. The method as recited in claim 4, wherein the analysis of the deployable unit by the system determines metadata for deploying the deployable unit using inspection of the deployable unit based at least in part on the particular type.

9. The method as recited in claim 4, wherein the deployable unit comprises a software installer.

10. The method as recited in claim 4, wherein the deployable unit comprises a machine image for a virtual machine.

11. The method as recited in claim 4, wherein the deployable unit comprises a virtualized container.

12. The method as recited in claim 4, wherein the deployment template specifies one or more dependencies of the deployable unit on one or more resources.

13. The method as recited in claim 4, wherein the deployment template specifies one or more outputs, wherein the one or more outputs are returned after deploying the deployable unit to the one or more resources of the multi-tenant provider network.

14. The method as recited in claim 4, wherein the deployment template specifies one or more inputs, wherein deploying the deployable unit to the one or more resources of the multi-tenant provider network comprises obtaining the one or more inputs and deploying the deployable unit based at least in part on the one or more inputs.

15. The method as recited in claim 4, wherein the deployment template specifies one or more regions of the multi-tenant provider network to which deployment of the deployable unit is permissible.

16. A non-transitory computer-readable storage medium storing program instructions computer-executable to perform:

receiving an indication of a deployable unit at a catalog system;

analyzing the deployable unit to determine a particular type of the deployable unit;

generating, based at least in part on the particular type of the deployable unit determined from said analyzing, a resource stack template representing one or more directives for deploying the deployable unit;

adding the resource stack template to a service catalog, wherein the service catalog comprises entries for a plurality of additional resource stack templates; and deploying the deployable unit to one or more resources of a multi-tenant provider network, wherein the deployable unit is deployed based at least on part on the directives of the resource stack template.

17. The non-transitory computer-readable storage medium as recited in claim 16, wherein the program instructions are further computer-executable to perform:

receiving a selection of the resource stack template from the service catalog, wherein the deployable unit is deployed based at least in part on the selection.

18. The non-transitory computer-readable storage medium as recited in claim 16, wherein the resource stack template comprises a description of the deployable unit and a description of resources of the multi-tenant provider network that are associated with the deployable unit.

19. The non-transitory computer-readable storage medium as recited in claim 16, wherein the program instructions are further computer-executable to perform:

soliciting input representing metadata for deploying the deployable unit, wherein the input is solicited using a user interface for the particular type.

20. The non-transitory computer-readable storage medium as recited in claim 16, wherein the analysis of the deployable unit by the catalog system determines metadata for deploying the deployable unit using inspection of the deployable unit based at least in part on the particular type.

* * * * *